US011691282B2

United States Patent
Maekawa et al.

(10) Patent No.: US 11,691,282 B2
(45) Date of Patent: Jul. 4, 2023

(54) FRICTION COMPENSATION DEVICE, AND ROBOT CONTROL DEVICE

(71) Applicant: Mitsubishi Electric Corporation, Tokyo (JP)

(72) Inventors: Kiyoshi Maekawa, Tokyo (JP); Akio Saito, Tokyo (JP); Yuma Isobe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/911,142

(22) PCT Filed: Mar. 26, 2020

(86) PCT No.: PCT/JP2020/013806
§ 371 (c)(1),
(2) Date: Sep. 13, 2022

(87) PCT Pub. No.: WO2021/192181
PCT Pub. Date: Sep. 30, 2021

(65) Prior Publication Data
US 2023/0110472 A1    Apr. 13, 2023

(51) Int. Cl.
B25J 9/16 (2006.01)
H02P 23/14 (2006.01)

(52) U.S. Cl.
CPC ........... B25J 9/1641 (2013.01); B25J 9/1633 (2013.01); B25J 9/1676 (2013.01); H02P 23/14 (2013.01)

(58) Field of Classification Search
CPC ...... B25J 9/1641; B25J 9/1633; B25J 9/1676; H02P 23/14
See application file for complete search history.

(56) References Cited

U.S. PATENT DOCUMENTS 8,963,461 B2    2/2015 Arima
2009/0295324 A1*  12/2009 Shim ..................... B25J 9/1676
318/632

(Continued)

FOREIGN PATENT DOCUMENTS

JP    2002-283276 A    10/2002
JP    2005-198404 A    7/2005

(Continued)

OTHER PUBLICATIONS

Nevmerzhitskiy, Maksim N.; Notkin, Boris S.; Vara, Andrey V.; and Zmeu, Konstantin V.; "Friction Model of Industrial Robot Joint with Temperature Correction by Example of KUKA KR10"; Jan. 6, 2019; Hindawi Journal of Robotics vol. 2019, Article ID 6931563, 11 pages (Year: 2019).*

(Continued)

Primary Examiner — Abby Y Lin
Assistant Examiner — Danielle Marie Jackson
(74) Attorney, Agent, or Firm — Xsensus LLP

(57) ABSTRACT

A friction compensation device of the present disclosure includes a drive torque calculation unit that calculates output torque of a transmission mechanism from a motor's position, velocity, and acceleration, the transmission mechanism being connected to a motor via a shaft to transmit the driving force of the motor, and a friction estimate value calculation unit that calculates a friction estimate value that is an estimate value of a friction force on the shaft. The friction estimate value calculation unit includes a friction correction value calculation unit that calculates a friction correction value to correct the friction force on the shaft, in accordance with the output of the drive torque calculation unit.

7 Claims, 19 Drawing Sheets

(56) References Cited

U.S. PATENT DOCUMENTS

| | | | | |
|---|---|---|---|---|
| 2012/0022690 A1* | 1/2012 | Ooga | ............... | B25J 9/1633 |
| | | | | 700/258 |
| 2013/0245829 A1* | 9/2013 | Ohta | ............... | B25J 9/1628 |
| | | | | 901/9 |
| 2015/0258685 A1 | 9/2015 | Matsumoto et al. | | |
| 2018/0243899 A1* | 8/2018 | Hashimoto | ............ | B25J 9/1664 |
| 2019/0137966 A1 | 5/2019 | Maekawa | | |
| 2022/0233271 A1* | 7/2022 | Peine | ............... | B25J 9/1633 |

FOREIGN PATENT DOCUMENTS

| | | |
|---|---|---|
| JP | 2014-27742 A | 2/2014 |
| JP | 2019-181664 A | 10/2019 |
| WO | 2014/021433 A1 | 2/2014 |
| WO | 2017/213182 A1 | 12/2017 |

OTHER PUBLICATIONS

International Search Report and Written Opinion dated Jun. 30, 2020, received for PCT Application PCT/JP2020/013806, filed on Mar. 26, 2020, 9 pages including English Translation.
Notice of Reasons for Refusal dated Jan. 5, 2021, received for JP Application 2020-549820, 4 pages including English Translation.
Decision to Grant dated Jun. 1, 2021, received for JP Application 2020-549820, 5 pages including English Translation.

* cited by examiner

FRICTION COMPENSATION DEVICE, AND ROBOT CONTROL DEVICE

CROSS-REFERENCE TO RELATED APPLICATION

The present application is based on PCT filing PCT/JP2020/013806, filed Mar. 26, 2020, the entire contents of which are incorporated herein by reference.

FIELD

The present disclosure relates to a friction compensation device that calculates friction torque on the drive shaft of a robot or an industrial machine, a collision detection device, a torque feedforward calculation device, and a robot control device, and a friction compensation method.

BACKGROUND

To drive control targets including robots and industrial machines, a controller calculates the dynamic characteristics of the control targets with high accuracy, thereby achieving higher-speed and higher-functionality of the control targets. Robots and industrial machines typically include a reduction mechanism that is a transmission mechanism on a drive shaft. To perform control such as detection of a collision of a robot with an obstacle, it is required to estimate a drive torque with high accuracy. In particular, there is a need for a technique for estimating a friction torque on a drive shaft with high accuracy.

Patent Literature 1 discloses a technique for detecting a collision of a robot with an obstacle. For the disclosed technique, a controller for controlling a robot having joints calculates a prediction value of a drive torque for driving a joint necessary to perform a currently performed motion, and compares a preset determination value with the difference between the prediction value and a practical measured value of the drive torque on the joint calculated from a practical motor current. As a result of such comparison, the collision of the robot with the obstacle is detected. The technique described in Patent Literature 1, calculates the prediction value of the drive torque on the joint, using a friction model that determines a friction torque acting on a joint of the robot by the sum of a Coulomb friction depending on the sign of the motor velocity and a viscous friction proportional to the motor velocity. That is, the drive torque acting on the joint is compensated for, using the friction model determined only by the motor velocity of each shaft.

CITATION LIST

Patent Literature

Patent Literature 1: Japanese Patent Application Laid-open No. 2002-283276

SUMMARY

Technical Problem

Unfortunately, as a result of detailed analysis of drive torque on the joints of a robot, it has been found that a friction torque varies even at the same velocity and drive unit temperature. That is, the friction model determined only by the motor velocity of each shaft as in the technique described in Patent Literature 1 does not take the variation in friction torque into consideration, and thus fails to estimate the friction torque with high accuracy.

The present disclosure has been made in view of the above, and an object thereof is to provide a friction compensation device capable of estimating a friction torque with higher accuracy than before.

Solution to Problem

To solve the above problem and achieve the object, a friction compensation device according to the present disclosure comprises: a drive torque calculation unit to calculate an output torque of a transmission mechanism from a motor's position, velocity, and acceleration, the transmission mechanism being connected to a motor via a shaft to transmit a driving force of the motor; and a friction estimate value calculation unit to calculate a friction estimate value that is an estimated value of a friction force on the shaft. The friction estimate value calculation unit includes a friction correction value calculation unit to calculate a friction correction value to correct the friction force on the shaft, in accordance with an output of the drive torque calculation unit.

Advantageous Effects of Invention

The friction compensation device according to the present disclosure has an effect of estimating the friction torque with higher accuracy than before.

DESCRIPTION OF EMBODIMENTS

A friction compensation device, a collision detection device, a torque feedforward calculation device, and a robot control device, and a friction compensation method according to embodiments of the present disclosure will be hereinafter described in detail with reference to the drawings.

First Embodiment

Figure 1:
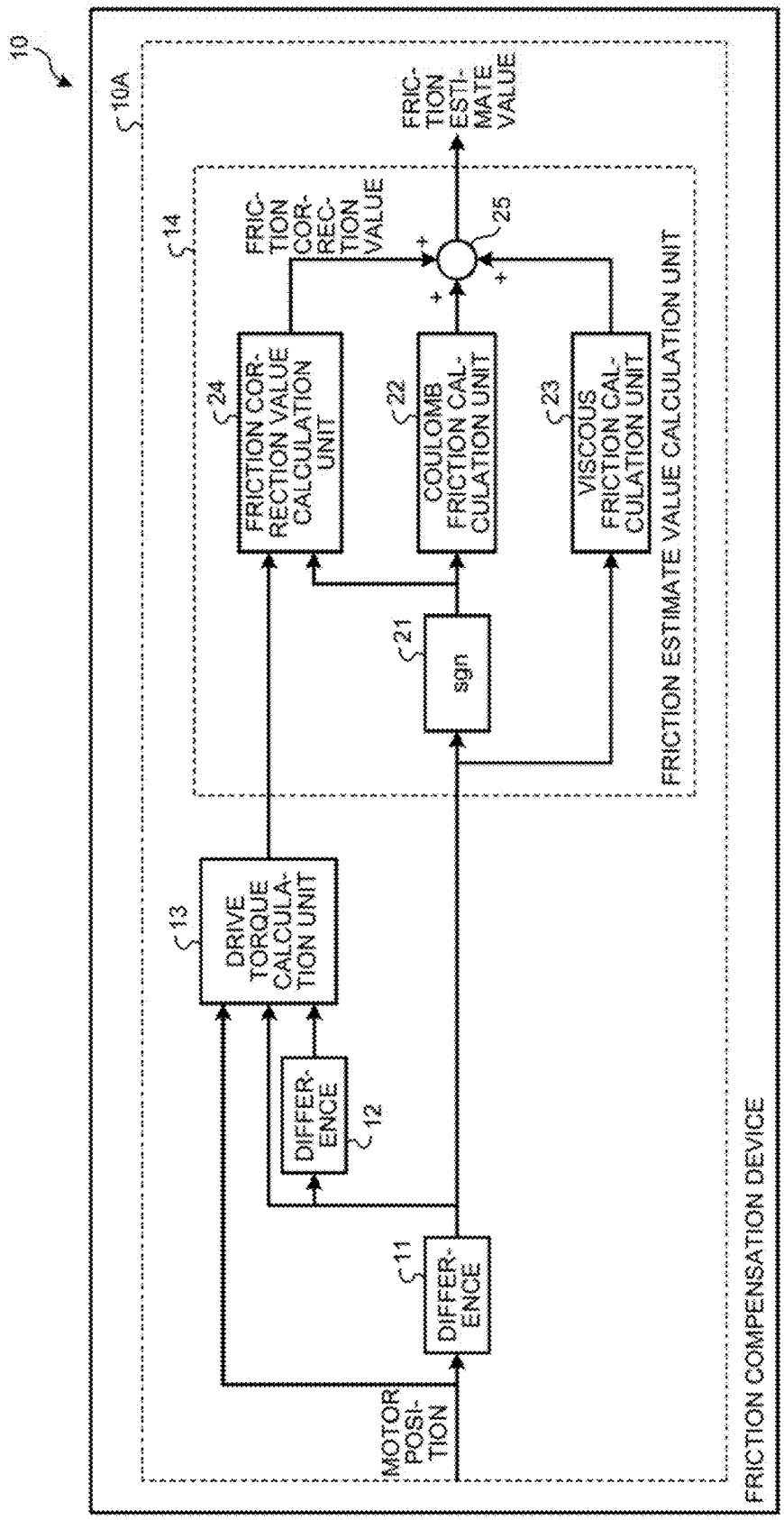
FIG. 1 is a block diagram schematically illustrating an example of a configuration of a friction compensation device according to a first embodiment.

FIG. 1 is a block diagram schematically illustrating an example of a configuration of a friction compensation device according to a first embodiment. A friction compensation device 10 according to the first embodiment is provided inside a robot control device for controlling a robot. An example of the robot is a six-axis robot. The friction compensation device 10 calculates a friction estimate value from a motor position and outputs the friction estimate value. The motor position is the position of a motor for the shaft of the robot. The friction estimate value is an estimated value of friction on each shaft of the robot.

The friction compensation device 10 includes a velocity calculator 11, an acceleration calculator 12, a drive torque calculation unit 13, and a friction estimate value calculation unit 14.

The velocity calculator 11 detects the velocity of the motor, using the difference between input motor positions that indicate the positions of the motor at different times. The velocity of the motor is hereinafter referred to as the motor velocity. The velocity calculator 11 outputs the motor velocity to the acceleration calculator 12, the drive torque calculation unit 13, and the friction estimate value calculation unit 14.

The acceleration calculator 12 detects the acceleration of the motor, using the difference between motor velocities at different times input from the velocity calculator 11. The acceleration of the motor is hereinafter referred to as the motor acceleration. The acceleration calculator 12 outputs the motor acceleration to the drive torque calculation unit 13.

On the basis of the equation of motion of the robot expressed by formula (1) below, the drive torque calculation unit 13 calculates the output torque of a transmission mechanism of the shaft that transmits the driving force of the motor of the robot. That is, the drive torque calculation unit 13 calculates each of an inertial force, a centrifugal force and a Coriolis force, and gravity on the transmission mechanism on the basis of that equation of motion (1). The transmission mechanism, which is a mechanism connected to the motor via the shaft, transmits the driving force of the motor to the output side. The drive torque calculation unit 13 outputs the calculated inertial force, centrifugal force and Coriolis force, and gravity on the transmission mechanism of each shaft to a friction correction value calculation unit 24 to be described later inside the friction estimate value calculation unit 14. Here, a vector composed of the output torque of the transmission mechanism of each shaft of the robot is denoted by T. A vector, which is denoted by "q", is composed of the position on each shaft obtained by converting the motor position on each shaft into the output position of the transmission mechanism. A vector, which is denoted by "v", is composed of the velocity of each shaft obtained by converting the motor velocity into the output velocity of the transmission mechanism. A vector, which is denoted by "a", is composed of the acceleration on each shaft obtained by converting the motor acceleration into the output acceleration of the transmission mechanism. The vector of the inertial force is M(q)a where q is the position obtained by converting the motor position into the transmission mechanism output position. The vector of the centrifugal force and the Coriolis force is h(q, v) where q is the position obtained by converting the motor position into the transmission mechanism output position, and v is the velocity. The vector of gravity is g(q) where q is the position obtained by converting the motor position into the transmission mechanism output position.

$$\tau = M(q)a + h(q,v) + g(q) \qquad (1)$$

That is, the drive torque calculation unit 13 can obtain the vector M(q)a of the inertial force, the vector h(q, v) of the centrifugal force and the Coriolis force, and the vector g(q) of gravity by calculating the vectors "q", "v", and "a" composed of values obtained by converting the input motor position, motor velocity, and motor acceleration into those on the output side of the transmission mechanism. Using these vectors, the drive torque calculation unit 13 can obtain the output torque on the output side of the transmission mechanism, that is, the drive torque τ as in formula (1).

Using the inertial force, the centrifugal force and the Coriolis force, and gravity on the shaft input from the drive torque calculation unit 13 and the motor velocity calculated by the velocity calculator 11, the friction estimate value calculation unit 14 calculates the friction estimate value that is an estimated value of a friction force applied to each shaft of the robot. The friction estimate value is calculated because it has been found that the variation in friction torque at the same motor velocity of the robot and the same temperature of the drive unit of the robot are affected by friction components that vary depending on an inertial force, a centrifugal force and a Coriolis force, and gravity on an output unit of the transmission mechanism of each shaft. The friction estimate value calculation unit 14 includes a sign circuit 21, a Coulomb friction calculation unit 22, a viscous friction calculation unit 23, the friction correction value calculation unit 24, and an adder 25.

The sign circuit 21 outputs a sign corresponding to the motor velocity output from the velocity calculator 11. In one example, the function of the sign circuit 21 can be expressed by the "sgn" function. The sgn function is a function that outputs −1 when the input is a negative number, outputs 0 when the input is 0, and outputs 1 when the input is a positive number.

The Coulomb friction calculation unit 22 multiplies the result of passage of the motor velocity through the sign circuit 21 by a Coulomb friction coefficient for each shaft to thereby calculate Coulomb friction on the shaft. The Coulomb friction depends on the sign of the motor velocity.

The viscous friction calculation unit 23 calculates viscous friction on the shaft by multiplying the motor velocity by a viscous friction coefficient. When the viscous friction varies depending on temperature, the value of the viscous friction coefficient may be set according to temperature. The viscous friction may be determined using not a model in which the viscous friction is proportional to the velocity to the first power, but a model in which the viscous friction is proportional to the velocity to a higher power. The Coulomb friction calculation unit 22 and the viscous friction calculation unit 23 calculate friction independent of the drive torque on the output side of the transmission mechanism.

In accordance with the output torque or output torque elements input from the drive torque calculation unit 13, the friction correction value calculation unit 24 calculates a friction correction value to correct the friction force on each shaft. An example of the output torque elements is an inertial force. In the first embodiment, the friction correction value calculation unit 24 calculates the friction correction value on the basis of the absolute values of the inertial force, the centrifugal force and the Coriolis force, and gravity on each shaft and the result of passage of the motor velocity through the sign circuit 21.

Figure 2:
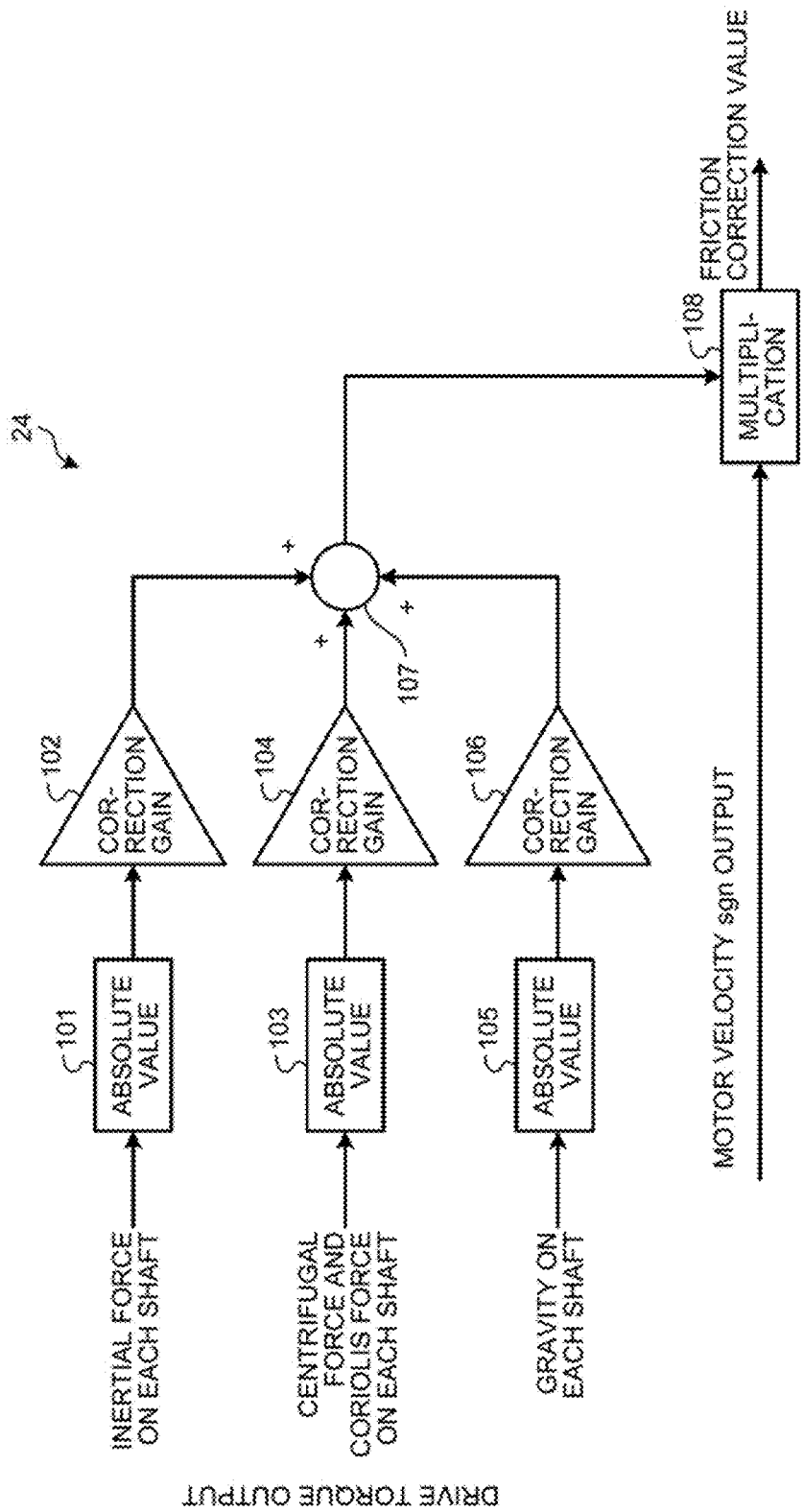
FIG. 2 is a block diagram schematically illustrating an example of a configuration of a friction correction value calculation unit in the friction compensation device according to the first embodiment.

FIG. 2 is a block diagram schematically illustrating an example of a configuration of the friction correction value calculation unit in the friction compensation device according to the first embodiment. The friction correction value calculation unit 24 includes an inertial force absolute value calculator 101, an inertial force correction unit 102, a centrifugal and Coriolis force absolute value calculator 103, a centrifugal and Coriolis force correction unit 104, a gravity absolute value calculator 105, a gravity correction unit 106, an adder 107, and a multiplier 108.

The inertial force absolute value calculator 101 calculates the absolute value of the inertial force on each shaft from the input inertial force vector. The inertial force correction unit 102 calculates a correction inertial force by multiplying the calculated absolute value of the inertial force on each shaft by a correction gain that is a correction parameter, and outputs the correction inertial force to the adder 107.

The centrifugal and Coriolis force absolute value calculator 103 calculates the absolute value of the sum of the centrifugal force and the Coriolis force on each shaft from the input vector of the sum of the centrifugal force and the Coriolis force. The centrifugal and Coriolis force correction unit 104 calculates a correction centrifugal and Coriolis force by multiplying the calculated absolute value of the centrifugal force and the Coriolis force on each shaft by a correction gain that is a correction parameter, and outputs the correction centrifugal and Coriolis force to the adder 107.

The gravity absolute value calculator 105 calculates the absolute value of gravity on each shaft from the input gravity vector. The gravity correction unit 106 calculates correction gravity by multiplying the calculated absolute value of gravity on each shaft by a correction gain that is a correction parameter, and outputs the correction gravity to the adder 107.

The adder 107 adds the correction inertial force, the correction centrifugal and Coriolis force, and the correction gravity on each shaft, and outputs its result to the multiplier 108.

The multiplier 108 calculates the friction correction value for each shaft by multiplying the result of the addition at the adder 107 for the shaft by a value resulting from the passage of the motor velocity output from the velocity calculator 11 in FIG. 1 through the sign circuit 21. Thus, in the first embodiment, the friction correction value to correct the friction force is a value having the same sign as the sign of the motor velocity and being directly proportional to the sum of the correction inertial force, the correction centrifugal and Coriolis force, and the correction gravity on each shaft.

Reference is made back to FIG. 1. The adder 25 adds, for each shaft, the Coulomb friction input from the Coulomb friction calculation unit 22, the viscous friction input from the viscous friction calculation unit 23, and the friction correction value input from the friction correction value calculation unit 24, and outputs the value of the resulting sum as the friction estimate value. In a six-axis robot, the friction estimate value is calculated and output for each of axis 1 to axis 6.

The output friction estimate value for each shaft is used for operations in robot control processing in another functional processing unit in the robot control device. In one example, the friction estimate value is used as a torque estimate value in a collision detection function of determining whether the robot has collided with an obstacle, a friction force component in torque feedforward, friction torque at a representative point when acceleration and deceleration times of a motion are calculated before that motion, or a friction torque estimate value when anomaly diagnosis is performed.

The friction compensation device 10 having the above configuration is constituted by a control unit 10A.

In the first embodiment, the friction estimate value calculation unit 14 of the friction compensation device 10 calculates the friction correction value that is a component containing the absolute values of the inertial force, the centrifugal force and the Coriolis force, and gravity on the output unit of the transmission mechanism of each shaft of the robot. The friction estimate value calculation unit 14 adds the friction correction value to the sum of the Coulomb friction depending on the sign of the motor velocity and the viscous friction proportional to the motor velocity, and outputs the friction estimate value that is the value resulting from the addition. This has an effect that when the variation in friction torque occurs under the same conditions of the velocity and the drive unit temperature, the friction estimate value, which is an estimated value of friction torque, can be estimated with higher accuracy than friction torque calculated on the basis of a friction model determined only by the velocity of each shaft. That is, it is possible to estimate, with high accuracy, friction that varies depending on the inertial force, the centrifugal force and the Coriolis force, and gravity on the output unit of the transmission mechanism.

Second Embodiment

The configuration of the friction compensation device 10 according to a second embodiment is the same as that in FIG. 1. However, the friction compensation device 10 according to the second embodiment is different from that of the first embodiment in the configuration of the friction correction value calculation unit 24. Thus, the following does not describe the same components as those of the first embodiment, and describes portions different from the first embodiment.

Figure 3:
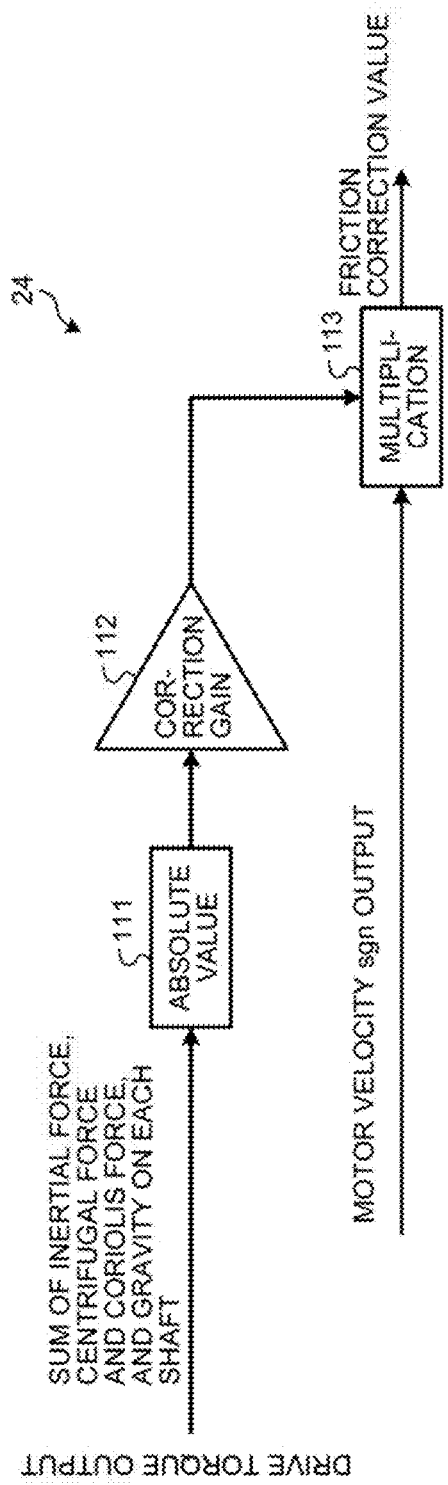
FIG. 3 is a block diagram schematically illustrating an example of a configuration of a friction correction value calculation unit in a friction compensation device according to a second embodiment.

FIG. 3 is a block diagram schematically illustrating an example of the configuration of the friction estimate value calculation unit in the friction compensation device according to the second embodiment. In the second embodiment, each of the inertial force, the centrifugal force and the Coriolis force, and gravity on the transmission mechanism of each shaft of the robot is not input to the friction correction value calculation unit 24, but the drive torque τ of the transmission mechanism, which is the sum of the inertial force, the centrifugal force and the Coriolis force, and gravity on each shaft, is input to the friction correction value calculation unit 24. The friction correction value calculation unit 24 includes a drive torque absolute value calculator 111, a drive torque correction unit 112, and a multiplier 113.

The drive torque absolute value calculator 111 calculates the absolute value of the input drive torque of the transmission mechanism, which is the sum of the inertial force, the centrifugal force and the Coriolis force, and gravity on each shaft. The drive torque correction unit 112 calculates a correction drive torque by multiplying the calculated absolute value of the drive torque of each shaft by a correction gain that is a correction parameter, and outputs the correction drive torque to the multiplier 113.

The multiplier 113 calculates a friction correction value for each shaft by multiplying the correction drive torque output from the drive torque correction unit 112 for each shaft by a value resulting from the passage of the motor velocity output from the velocity calculator 11 in FIG. 1 through the sign circuit 21. Thus, in the second embodiment, the friction correction value to correct the friction force is a value having the same sign as the sign of the motor velocity and being directly proportional to the absolute value of the sum of the absolute values of the inertial force, the centrifugal force and the Coriolis force, and gravity on each shaft.

In the second embodiment, the friction correction value calculation unit 24 of the friction compensation device 10 calculates the friction correction value by multiplying the absolute value of the sum of the absolute values of the inertial force, the centrifugal force and the Coriolis force, and gravity on the output unit of the transmission mechanism of each shaft of the robot by the correction gain and the same sign as the sign of the motor velocity. In addition to the effect of the first embodiment, this has an effect that the calculation of the friction correction value can be simplified as compared with that in the first embodiment.

Third Embodiment

Figure 4:
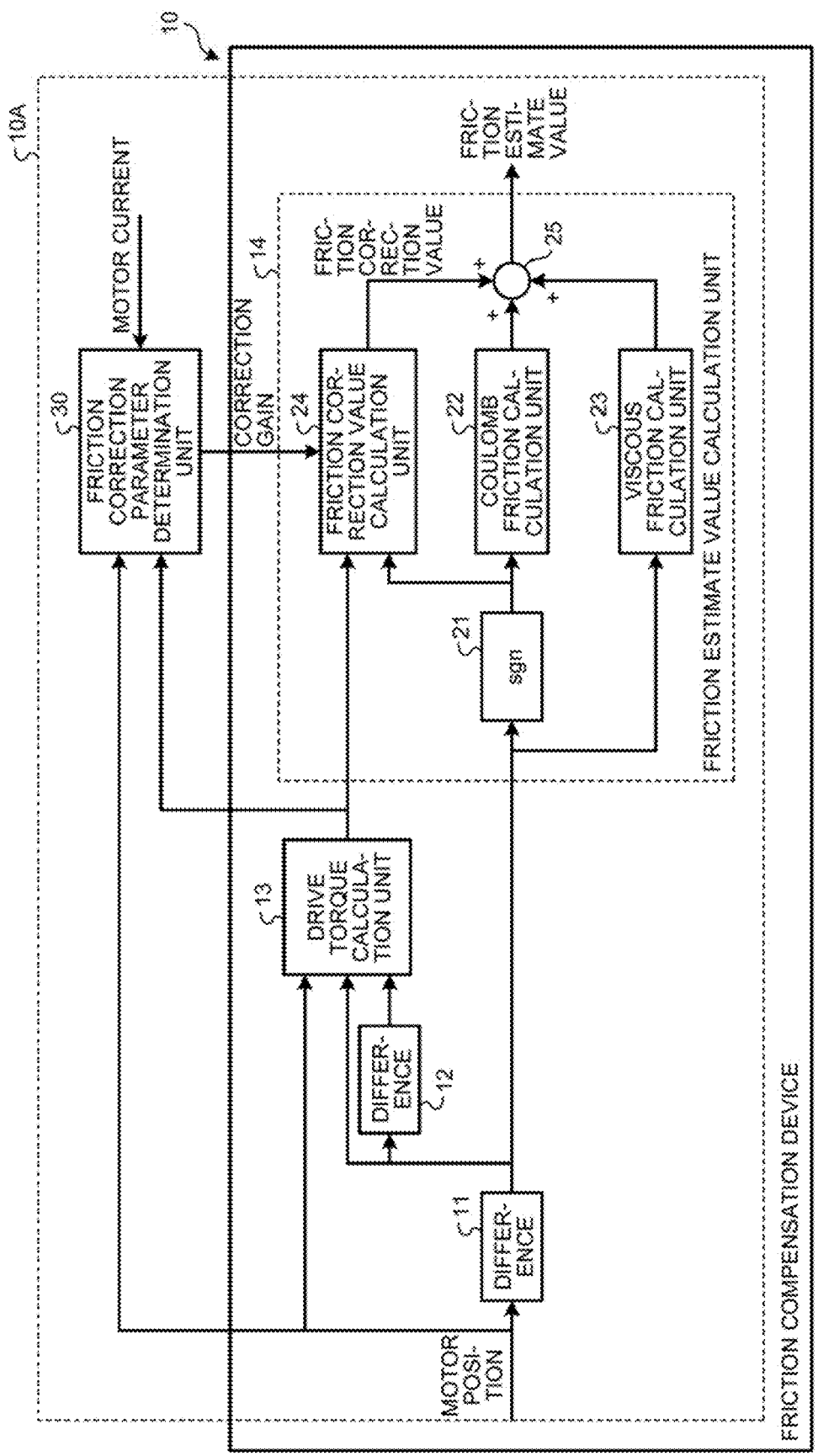
FIG. 4 is a block diagram schematically illustrating an example of a configuration of a friction compensation device according to a third embodiment.

FIG. 4 is a block diagram schematically illustrating an example of a configuration of a friction compensation device according to a third embodiment. Note that the same components as those in the above-described embodiments are denoted by the same reference numerals and will not be described. The following describes portions different from the above-described embodiments. The friction compensation device 10 according to the third embodiment further includes a friction correction parameter determination unit 30 that calculates correction gains used by the friction correction value calculation unit 24. FIG. 4 illustrates the friction correction parameter determination unit 30 provided outside the friction compensation device 10 and the robot control device. The illustrated friction correction parameter determination unit 30 is made by a personal computer, for example. The friction correction parameter determination unit 30 may be provided inside the friction compensation device 10 or the robot control device. Assume that the friction correction value calculation unit 24 has the configuration in FIG. 2 of the first embodiment.

In the third embodiment, the drive torque calculation unit 13 calculates a vector $\tau_m$ that is torque required to accelerate or decelerate the motor of each shaft shown in the following formula (2), in addition to the output torque τ of the transmission mechanism of each shaft of the robot in formula (1). $I_m$ is the moment of inertia of the motor and a high-velocity-side part of the transmission mechanism. $\tau_m$ is also referred to as the motor inertial force.

$$\tau_m = I_m a \tag{2}$$

The inertial force, the centrifugal force and the Coriolis force, and gravity, which are the elements of the output torque τ of the transmission mechanism in formula (1), and the motor inertial force $\tau_m$ in formula (2) are input from the drive torque calculation unit 13 to the friction correction parameter determination unit 30. The motor position and the motor current are also input to the friction correction parameter determination unit 30.

First, the friction correction parameter determination unit 30 calculates Coulomb friction and viscous friction from the motor position, using the same method and parameters as those used by the Coulomb friction calculation unit 22 and the viscous friction calculation unit 23, and calculates the sum τf of these frictions. Next, the friction correction parameter determination unit 30 calculates, from the motor current, a practical measured value τr of the drive torque including friction, using information on the torque constant and the reduction ratio. Assume that the vector of the inertial force, the vector of the centrifugal and Coriolis force that is a combined centrifugal force and Coriolis force, and the vector of gravity are denoted by $\tau_a$, $\tau_b$, and $\tau_c$, respectively. Also, the correction gain by which to multiply the absolute value of the inertial force on each shaft, which is used in the friction correction value calculation unit 24, is denoted by Ka. The correction gain by which to multiply the absolute value of the sum of the centrifugal force and the Coriolis force on each shaft, which is used in the friction correction value calculation unit 24, is denoted by Kb. Further, the correction gain by which to multiply the absolute value of gravity on each shaft, which is used in the friction correction value calculation unit 24, is denoted by Kc. On the basis of these assumptions, the following formula (3) holds true.

$$\tau_1 - \tau - \tau_m - \tau_f = y \cdot p \tag{3}$$

Here, vectors y and p in formula (3) are expressed by the following formulas (4) and (5). abs(X) is a function that returns the absolute value of the vector X.

$$y = [abs(\tau_a), abs(\tau_b), abs(\tau_c)] \tag{4}$$

$$p = [Ka, Kb, Kc]^T \tag{5}$$

Formulas (3) to (5) are all formulas for each shaft. Using data from a time t1 to a time to where n is a natural number of two or more, the friction correction parameter determination unit 30 calculates the correction gain p in formula (5) to be output to the friction correction value calculation unit 24. For this purpose, matrices T and Y are defined by the following formulas (6) and (7), respectively, where τ(k) is the left side of formula (3) and y(k) is y on the right side of formula (3) at a time tk where k is a natural number of one or more and n or less. Using the pseudo inverse matrix Y' of Y calculates the correction gain p as indicated in the following formula (8).

[Formula 1]
$$T = \begin{pmatrix} \tau(1) \\ \tau(2) \\ \cdot \\ \cdot \\ \tau(n) \end{pmatrix} \quad (6)$$

[Formula 2]
$$Y = \begin{pmatrix} y(1) \\ y(2) \\ \cdot \\ \cdot \\ y(n) \end{pmatrix} \quad (7)$$

$$p = Y'T \quad (8)$$

The friction correction parameter determination unit 30 outputs correction parameters, i.e., the individual elements of the correction gain p calculated about each shaft as described above. That is, the friction correction parameter determination unit 30 outputs these elements as the correction gains to be used in the friction correction value calculation unit 24. Specifically, the element Ka of the correction gain p is the correction gain to be used by the inertial force correction unit 102, and is output to the inertial force correction unit 102. The element Kb of the correction gain p is the correction gain to be used by the centrifugal and Coriolis force correction unit 104, and is output to the centrifugal and Coriolis force correction unit 104. The element Kc of the correction gain p is the correction gain to be used by the gravity correction unit 106, and is output to the gravity correction unit 106.

In the third embodiment, on the basis of the motor position, the motor current, the drive torque on each shaft of the transmission mechanism, and the motor inertial force on each shaft, the friction correction parameter determination unit 30 calculates the correction gains to be used in the friction correction value calculation unit 24. This allows high-accuracy determination of the correction gains that are correction coefficients of friction that varies depending on the inertial force, the centrifugal force and the Coriolis force, and gravity on the transmission mechanism. As a result, the third embodiment has an effect that the accuracy of the friction estimate value can be improved as compared with that of the first and second embodiments.

Fourth Embodiment

The configuration of the friction compensation device 10 according to a fourth embodiment is the same as that in FIG. 4 of the third embodiment. However, the fourth embodiment is different from the third embodiment in the functions of the friction correction parameter determination unit 30 and the friction correction value calculation unit 24. The friction correction value calculation unit 24 has the same configuration as that in FIG. 3 of the second embodiment. The following is the description as to the difference from the above-described embodiments.

Assume that a shaft for which to determine a correction gain has the maximum gravity acting thereon in the positive direction at a position denoted by θ1. Also, the shaft has no gravity acting thereon at a position denoted by θ2. Further, the shaft has the maximum gravity acting thereon in the negative direction at a position denoted by θ3. The robot is operated on a single axis such that the robot passes through the positions θ1, θ2, and θ3 at a low, constant velocity, during which operation, the motor positions, the motor velocities, and the motor currents are measured. Drive torques calculated from the motor currents at the positions θ1, θ2, and θ3 are denoted by τ1, τ2, and τ3, respectively. In this case, the maximum gravity value (τ1−τ3)/2 is calculated from τ1 and τ3. The sum of the Coulomb friction and the friction correction value when the gravity becomes maximum is calculated as (τ1+τ3)/2. Since τ2 is a Coulomb friction force, the friction correction value when gravity becomes maximum is calculated as (τ1+τ3)/2−τ2. Thus, the correction gain K is calculated by the following formula (9).

$$K=((\tau1+\tau3)/2-\tau2)/((\tau1-\tau3)/2) \quad (9)$$

Here, formula (9) is a calculation formula for the operation performed so that τ1>τ3 and τ2>0 hold true. The friction correction parameter determination unit 30 outputs the value of the correction gain K calculated by formula (9) as the correction gain to be used by the friction correction value calculation unit 24 in FIG. 3.

In the fourth embodiment, the shaft for which to determine the correction gain has the maximum gravity acting thereon in the positive direction at the position θ1, has no maximum gravity acting thereon at the position θ2, and has the maximum gravity acting thereon in the negative direction at the position θ3. The correction gain is calculated from drive torques that are obtained by operating the robot on the single axis such that the robot passes through the positions θ1, θ2, and θ3 at a low, constant velocity. In addition to the effect of the second embodiment, this can provide an effect that the correction coefficient of friction that varies depending on the output torque of the transmission mechanism can be determined with high accuracy on the shaft to which the gravity is applied.

Fifth Embodiment

Figure 5:
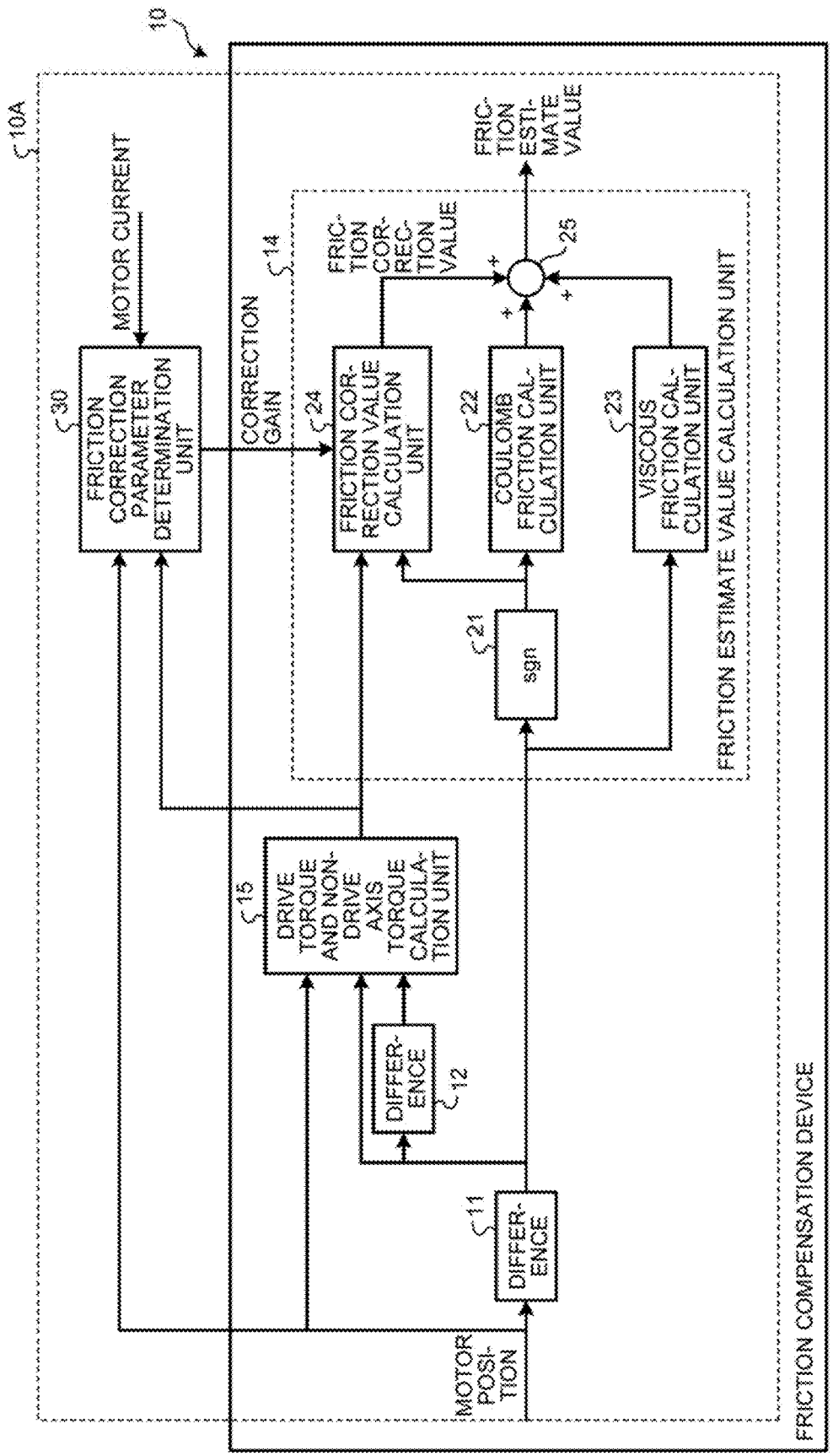
FIG. 5 is a block diagram schematically illustrating an example of a configuration of a friction compensation device according to a fifth embodiment.

FIG. 5 is a block diagram schematically illustrating an example of a configuration of a friction compensation device according to a fifth embodiment. Note that the same components as those in the above-described embodiments are denoted by the same reference numerals and will not be described. The following is the description as to the difference from the above-described embodiments.

The friction compensation device 10 according to the fifth embodiment includes a drive torque and non-drive axis torque calculation unit 15 instead of the drive torque calculation unit 13 described in the first to fourth embodiments. The drive torque and non-drive axis torque calculation unit 15 calculates forces and moments in non-drive directions in addition to torque on a drive shaft. The friction correction value calculation unit 24 calculates the friction correction value from the drive torque and the forces and moments in the non-drive directions. The forces and moments in the non-drive directions can be easily calculated by using the Newton-Euler equations of motion. The drive torque and non-drive axis torque calculation unit 15 corresponds to the drive torque calculation unit.

Figure 6:
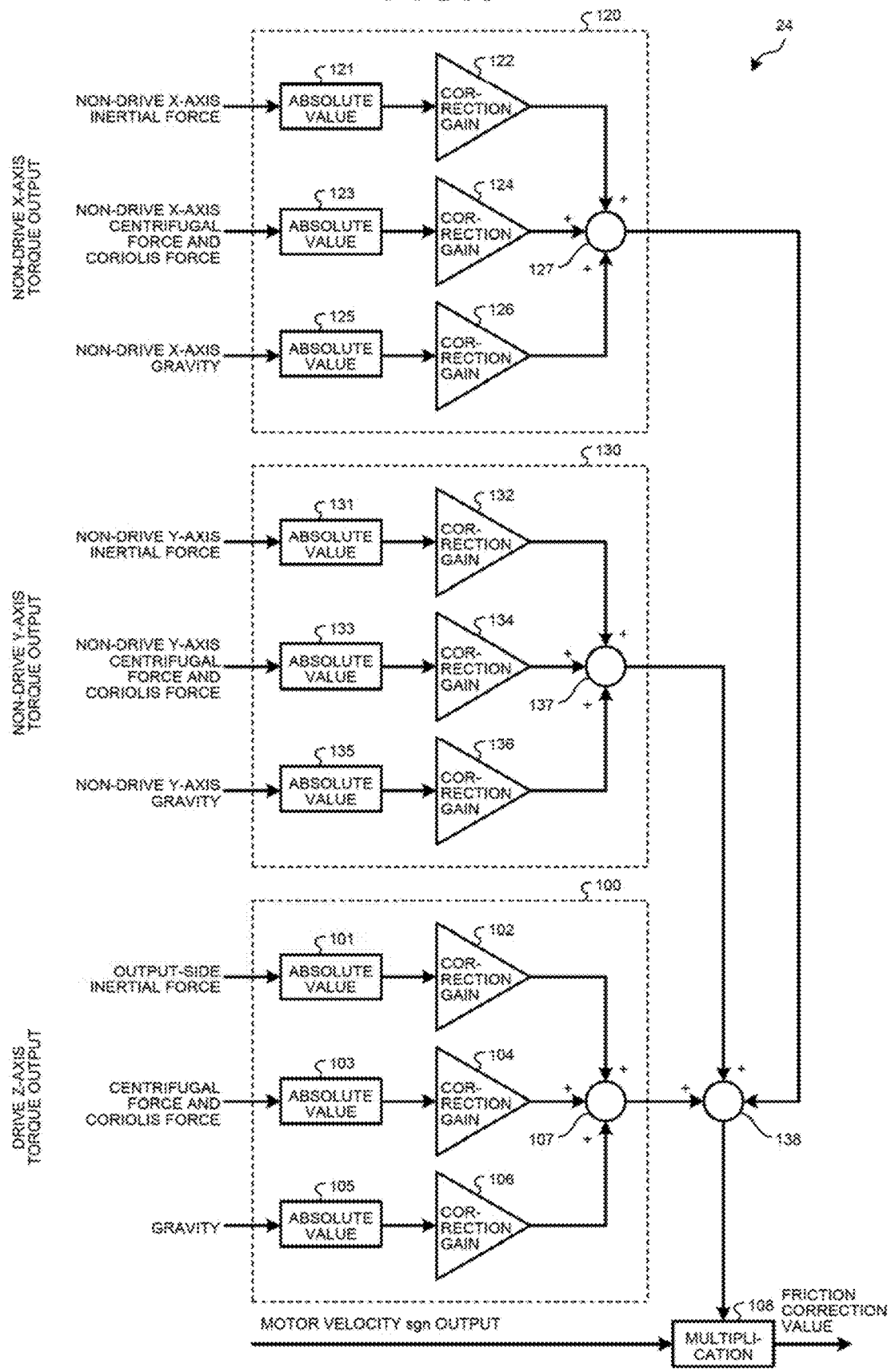
FIG. 6 is a block diagram schematically illustrating an example of a configuration of a friction correction value calculation unit in the friction compensation device according to the fifth embodiment.

FIG. 6 is a block diagram schematically illustrating an example of the configuration of the friction correction value calculation unit in the friction compensation device according to the fifth embodiment. The friction correction value calculation unit 24 is the friction correction value calculation unit in FIG. 2 of the first embodiment extending to the configuration regarding non-drive axes. Here, assume that the drive shaft is defined as the Z axis, and the non-drive axes are defined as the X axis and the Y axis. The friction estimate value calculation unit 14 includes a non-drive X-axis torque correction amount calculator 120, a non-drive Y-axis torque correction amount calculator 130, a drive torque correction amount calculator 100, an adder 138, and the multiplier 108. The non-drive X-axis torque correction amount calculator 120 calculates a correction amount of torque that is a moment about the X axis that is not a drive axis. The non-drive Y-axis torque correction amount calculator 130 calculates a correction amount of torque that is a moment about the Y axis that is not a drive axis. The drive torque correction amount calculator 100 calculates a drive torque correction amount for the Z axis that is a drive axis. The X axis that is not a drive axis is referred to as the non-drive X axis, and the Y axis that is not a drive axis is referred to as the non-drive Y axis.

The drive torque and non-drive axis torque calculation unit 15 inputs, to the non-drive X-axis torque correction amount calculator 120, an inertial force, a centrifugal force and a Coriolis force, and gravity of the torque, i.e., moment about the non-drive X axis. The non-drive X-axis torque correction amount calculator 120 calculates the non-drive X-axis torque correction amount from these input farces and gravity. The non-drive X-axis torque correction amount calculator 120 includes an inertial force absolute value calculator 121, an inertial force correction unit 122, a centrifugal and Coriolis force absolute value calculator 123, a centrifugal and Coriolis force correction unit 124, a gravity absolute value calculator 125, a gravity correction unit 126, and an adder 127.

The inertial force absolute value calculator 121 calculates the absolute value of the input inertial force on the non-drive X-axis. The inertial force correction unit 122 calculates a correction inertial force by multiplying the calculated absolute value of the inertial force by a correction gain that is a correction parameter, and outputs the correction inertial force to the adder 127.

The centrifugal and Coriolis force absolute value calculator 123 calculates the absolute value of the input centrifugal force and Coriolis force on the non-drive X axis. The centrifugal and Coriolis force correction unit 124 calculates a correction centrifugal and Coriolis force by multiplying the calculated absolute value of the centrifugal force and the Coriolis force on the non-drive X-axis by a correction gain that is a correction parameter, and outputs the correction centrifugal and Coriolis force to the adder 127.

The gravity absolute value calculator 125 calculates the absolute value of the input gravity on the non-drive X axis. The gravity correction unit 126 calculates correction gravity by multiplying the calculated absolute value of gravity on the non-drive X axis by a correction gain that is a correction parameter, and outputs the correction gravity to the adder 127.

The adder 127 adds the correction inertial force, the correction centrifugal and Coriolis force, and the correction gravity on the non-drive X axis to thereby calculate the correction amount for the non-drive X axis, and outputs the correction amount of the non-drive X axis to the adder 138.

The drive torque and non-drive axis torque calculation unit 15 inputs, to the non-drive Y-axis torque correction amount calculator 130, an inertial force, a centrifugal force and a Coriolis force, and gravity of the torque, i.e., moment about the non-drive Y axis. The non-drive Y-axis torque correction amount calculator 130 calculates the non-drive Y-axis torque correction amount from these input forces and gravity. The non-drive Y-axis torque correction amount calculator 130 includes an inertial force absolute value calculator 131, an inertial force correction unit 132, a centrifugal and Coriolis force absolute value calculator 133, a centrifugal and Coriolis force correction unit 134, a gravity absolute value calculator 135, a gravity correction unit 136, and an adder 137. The components of the non-drive Y-axis torque correction amount calculator 130 have the same functions as discussed in relation to the components of the non-drive X-axis torque correction amount calculator 120, except that the non-drive Y-axis torque correction amount calculator 130 performs processing on the inertial force, the centrifugal force and the Coriolis force, and gravity of the torque on the non-drive Y axis.

The drive torque and non-drive axis torque calculation unit 15 inputs, to the drive torque correction amount calculator 100, an inertial force, a centrifugal force and a Coriolis force, and gravity of the torque on the drive shaft. The drive torque correction amount calculator 100 calculates the drive torque correction amount that is a correction amount for the drive shaft. The configuration of the drive torque correction amount calculator 100 is the same as that described in FIG. 2, and thus will not be described.

The adder 138 adds the non-drive X-axis torque correction amount output from the non-drive X-axis torque correction amount calculator 120, the non-drive Y-axis torque correction amount output from the non-drive Y-axis torque correction amount calculator 130, and the drive torque correction amount output from the drive torque correction amount calculator 100, and outputs the result of the addition, to the multiplier 108.

The multiplier 108 calculates the friction correction value by multiplying the addition result from the adder 138 by a value resulting from the passage of the motor velocity output from the velocity calculator 11 in FIG. 5 through the sign circuit 21.

The friction correction parameter determination unit 30 in the fifth embodiment, which is an extended form of the friction correction parameter determination unit in the third embodiment, calculates the matrices Y and T from the motor currents and the motor positions from the time t1 to the time tn, using formulas (3) to (7), and calculates the vector p composed of the correction gains Ka, Kb, and Kc, using the pseudo inverse matrix Y' shown in formula (8).

In the friction compensation device 10 of the fifth embodiment, the drive torque and non-drive axis torque calculation unit 15 calculates the forces and moments in non-drive directions in addition to the torque on the drive shaft, and the friction correction value calculation unit 24 calculates the friction correction value from the drive torque and moments in the non-drive directions. Consequently, friction components that vary depending on the forces and moments in the non-drive directions can also be compensated for with high accuracy. That is, it becomes possible to provide an effect of estimating the friction torque with high accuracy, taking into consideration the friction that varies depending on the inertial forces, the centrifugal forces and the Coriolis forces, and gravity in non-drive directions.

Sixth Embodiment

The configuration of the friction compensation device 10 according to the sixth embodiment is the same as that in FIG. 5. However, the friction compensation device 10 according to the sixth embodiment is different from that of the fifth embodiment in the configurations of the friction correction value calculation unit 24 and the friction correction parameter determination unit 30. Hereinafter, the same components as those of the above-described embodiments are denoted by the same reference numerals and will not be described. The difference from the above-described embodiments will be described.

Figure 7:
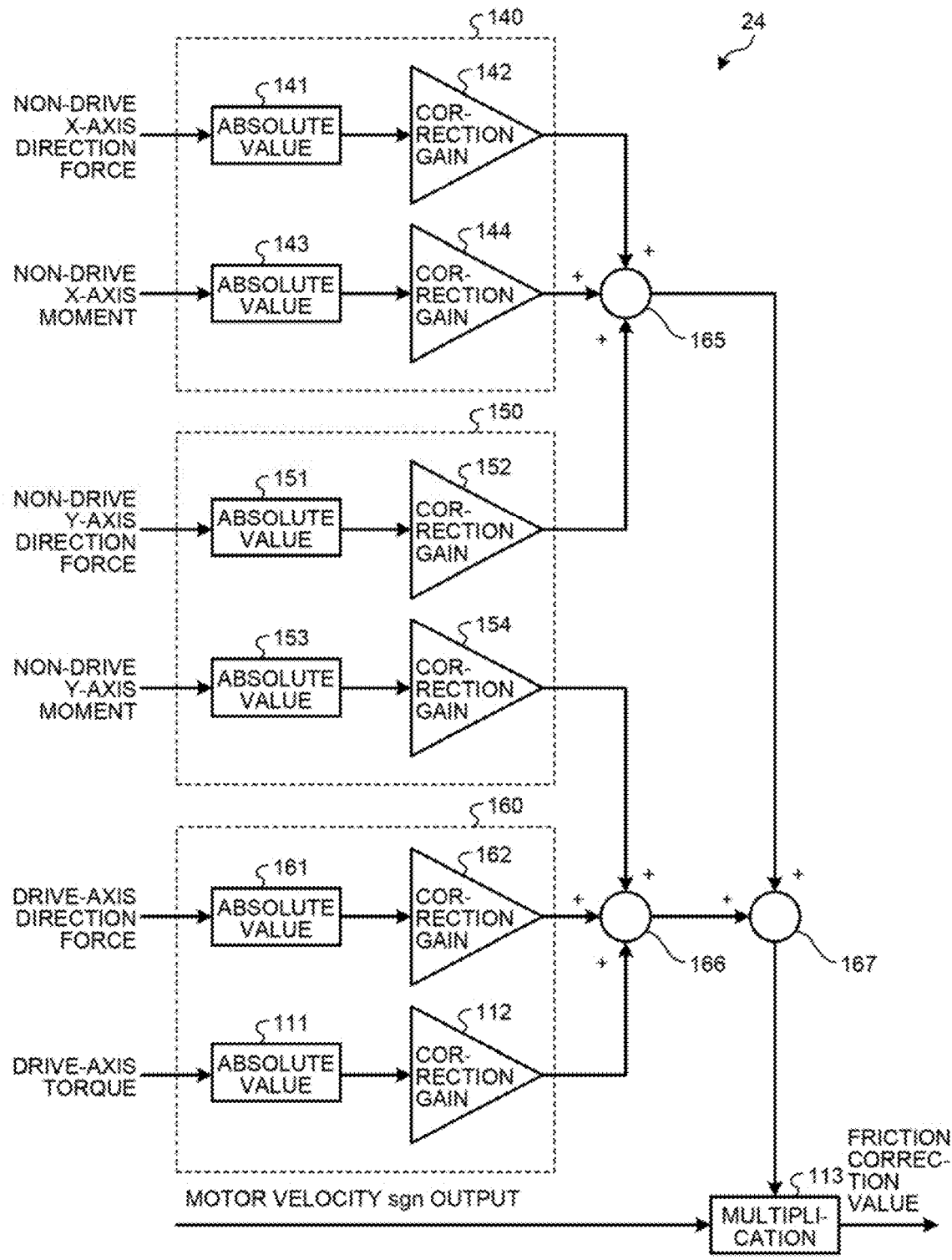
FIG. 7 is a block diagram schematically illustrating an example of a configuration of a friction correction value calculation unit in a friction compensation device according to a sixth embodiment.

FIG. 7 is a block diagram schematically illustrating an example of the configuration of the friction correction value calculation unit in the friction compensation device according to the sixth embodiment. The friction correction value calculation unit 24 is the friction correction value calculation unit 24 in FIG. 3 of the second embodiment extending to the configuration regarding non-drive axes. The friction correction value calculation unit 24 includes a non-drive X-axis correction amount calculator 140, a non-drive Y-axis correction amount calculator 150, a drive-axis correction amount calculator 160, adders 165, 166, and 167, and the multiplier 113.

The non-drive X-axis correction amount calculator 140 calculates a friction correction amount from a moment and a force in the direction of the X axis that is not a drive axis. The non-drive X-axis correction amount calculator 140 includes a force absolute value calculator 141, a force correction unit 142, a moment absolute value calculator 143, and a moment correction unit 144. The drive torque and non-drive axis torque calculation unit 15 inputs, to the force absolute value calculator 141, a non-drive X-axis force that is a force in the direction of the non-drive X axis. The force absolute value calculator 141 calculates the absolute value of the input non-drive X-axis force. The force correction unit 142 calculates a correction non-drive X-axis force by multiplying the calculated absolute value of the non-drive X-axis force by a correction gain that is a correction parameter, and outputs the correction non-drive X-axis force to the adder 165. The drive torque and non-drive axis torque calculation unit 15 inputs, to the moment absolute value calculator 143, a non-drive X-axis moment, i.e., a moment in the direction about the non-drive X axis. The non-drive X-axis moment is the sum of an inertial force, a centrifugal force and a Coriolis force, and gravity. The moment absolute value calculator 143 calculates the absolute value of the input non-drive X-axis moment. The moment correction unit 144 calculates a correction non-drive X-axis moment by multiplying the calculated absolute value of the non-drive X-axis moment by a correction gain that is a correction parameter, and outputs the correction non-drive X-axis moment to the adder 165.

The non-drive Y-axis correction amount calculator 150 calculates a friction correction amount from a moment and a force in the direction of the Y axis that is not a drive axis. The non-drive Y-axis correction amount calculator 150 includes a force absolute value calculator 151, a force correction unit 152, a moment absolute value calculator 153, and a moment correction unit 154. The functions of the force absolute value calculator 151, the force correction unit 152, the moment absolute value calculator 153, and the moment correction unit 154 are the same as the functions of the force absolute value calculator 141, the force correction unit 142, the moment absolute value calculator 143, and the moment correction unit 144 of the non-drive X-axis correction amount calculator 140 except that calculation is performed about the moment or the force in the non-drive Y-axis direction. A correction non-drive Y-axis force is output from the force correction unit 152. A correction non-drive Y-axis moment is output from the moment correction unit 154.

The drive-axis correction amount calculator 160 calculates a friction correction amount from drive torque and a force in the drive-axis direction. The drive-axis correction amount calculator 160 includes a force absolute value calculator 161, a force correction unit 162, the drive torque absolute value calculator 111, and the drive torque correction unit 112. The functions of the force absolute value calculator 161 and the force correction unit 162 are the same as the functions of the force absolute value calculator 141 and the force correction unit 142 of the non-drive X-axis correction amount calculator 140 except that calculation is performed on the force in the drive-axis direction. The drive torque absolute value calculator 111 and the drive torque correction unit 112 are the same as those described in the second embodiment. A correction drive-axis force is output from the force correction unit 162. A correction drive-axis torque is output from the drive torque correction unit 112.

The adder 165 adds the correction non-drive X-axis force output from the force correction unit 142, the correction non-drive X-axis moment output from the moment correction unit 144, and the correction non-drive Y-axis force output from the force correction unit 152. The adder 166 adds the correction non-drive Y-axis moment output from the moment correction unit 154, the correction drive-axis force output from the force correction unit 162, and the correction drive-axis torque output from the drive torque correction unit 112. The adder 167 adds the addition result from the adder 165 and the addition result from the adder 166, and outputs the result of the addition, to the multiplier 113.

The multiplier 113 calculates the friction correction value by multiplying the addition result from the adder 167 by a value resulting from the passage of the motor velocity output from the velocity calculator 11 in FIG. 5 through the sign circuit 21.

The friction correction parameter determination unit 30, which is an extended form of friction correction parameter determination unit in the third embodiment, calculates the matrices Y and T from the motor currents and the motor positions from the time t1 to tn, using formulas (3) to (7), and calculates the vector p composed of the correction gains Ka, Kb, and Kc, using the pseudo inverse matrix Y' shown in formula (8).

In the friction compensation device 10 of the sixth embodiment, the drive torque and non-drive axis torque calculation unit 15 calculates moments and forces in non-drive directions in addition to a force and torque on a drive shaft, and the friction correction value calculation unit 24 calculates the friction correction value from the moments and the forces in the drive-axis direction and the non-drive directions. This has an effect that friction that varies depending on the moments and the forces in the non-drive directions can be estimated with high accuracy.

Seventh Embodiment

The configuration of the friction compensation device 10 according to a seventh embodiment is the same as that in FIG. 4 of the third embodiment. However, the seventh embodiment is different from the third embodiment in the configurations of the drive torque calculation unit 13 and the friction correction parameter determination unit 30. The following is the description as to the difference from the above-described embodiments.

The drive torque calculation unit 13 calculates a motor inertial force $\tau_m$ and a drive torque $\tau$ of the transmission mechanism, and outputs the motor inertial force $\tau_m$ and the drive torque t to the friction correction parameter determination unit 30. The motor inertial force $\tau_m$ is torque required to accelerate or decelerate the motor. The drive torque $\tau$ is the sum of the inertial force, the centrifugal force and the Coriolis force, and gravity on the transmission mechanism of each shaft of the robot.

Figure 8:
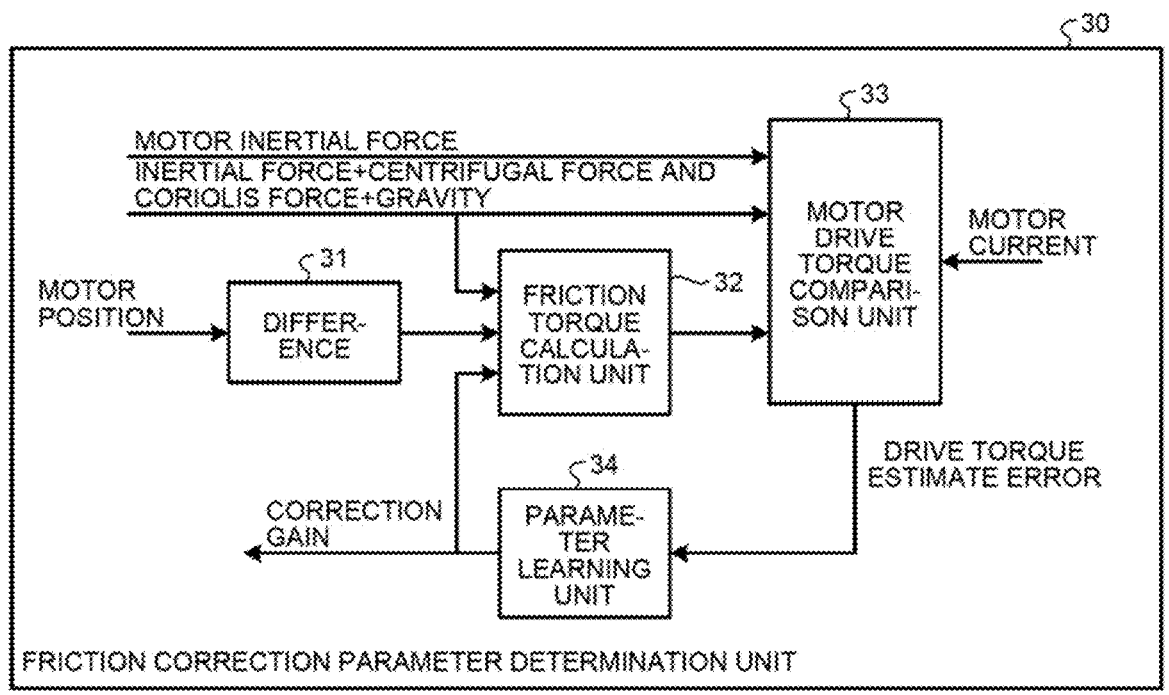
FIG. 8 is a block diagram schematically illustrating an example of a configuration of a friction correction parameter determination unit in a friction compensation device according to a seventh embodiment.

FIG. 8 is a block diagram schematically illustrating an example of the configuration of the friction correction parameter determination unit in the friction compensation device according to the seventh embodiment. The friction correction parameter determination unit 30 includes a velocity calculator 31, a friction torque calculation unit 32, a motor drive torque comparison unit 33, and a parameter learning unit 34.

The velocity calculator 31 calculates the motor velocity, using the difference between input motor positions at different times. The friction torque calculation unit 32 has the same function as the friction estimate value calculation unit 14. That is, the friction torque calculation unit 32 calculates Coulomb friction, viscous friction, and a friction correction value, using the motor velocity input from the velocity calculator 31, the inertial force, the centrifugal force and the Coriolis force, and gravity on the transmission mechanism input from the drive torque calculation unit 13, and correction gains input from the parameter learning unit 34. Furthermore, the friction torque calculation unit 32 calculates a friction torque estimate value by adding the Coulomb friction, the viscous friction, and the friction correction value. The friction torque estimate value corresponds to the friction estimate value described above.

The motor drive torque comparison unit 33 calculates a drive torque estimate error $\tau_r - (\tau + \tau_m + \tau_f)$ that is the difference between the practical measured value $\tau_r$ of the drive torque calculated from the motor current and the sum of the motor inertial force $\tau_m$, the drive torque $\tau$ of the transmission mechanism, and the friction torque estimate value $\tau_f$. The motor drive torque comparison unit 33 outputs the drive torque estimate error $\tau_r - (\tau + \tau_m + \tau_f)$ to the parameter learning unit 34.

The parameter learning unit 34 first sets the initial values of the correction gains in the friction torque calculation unit 32. The parameter learning unit 34 searches for correction gains to reduce the drive torque estimate error input from the motor drive torque comparison unit 33, and outputs the search results to the friction torque calculation unit 32. An example of a correction gain search technique is Bayesian optimization or particle swarm optimization. In one example, the parameter learning unit 34 outputs, to the friction correction value calculation unit 24, correction gains that are correction parameters that allows the drive torque estimate error to fall within a predetermined range. At this time, if the parameter learning unit 34 can find correction gains that result in a drive torque estimate error smaller than the drive torque estimate error obtained with correction gains that are conditions used in learning, the parameter learning unit 34 may output the found correction gains to the friction correction value calculation unit 24 as conditions similar to the conditions used in learning.

In the friction compensation device 10 according to the seventh embodiment, learning is performed to search for correction gains to reduce a drive torque estimate error that is the difference between the practical measured value of the drive torque and the sum of the motor inertial force, the drive torque of the transmission mechanism, and the friction torque estimate value. Also, correction gains that are the results of the learning are set in the friction correction value calculation unit 24. This allows the friction torque to be compensated for with high accuracy according to operation. That is, it becomes possible to provide an effect of estimating friction with high accuracy under conditions used in learning and conditions similar to the conditions used in the learning.

Eighth Embodiment

Figure 9:
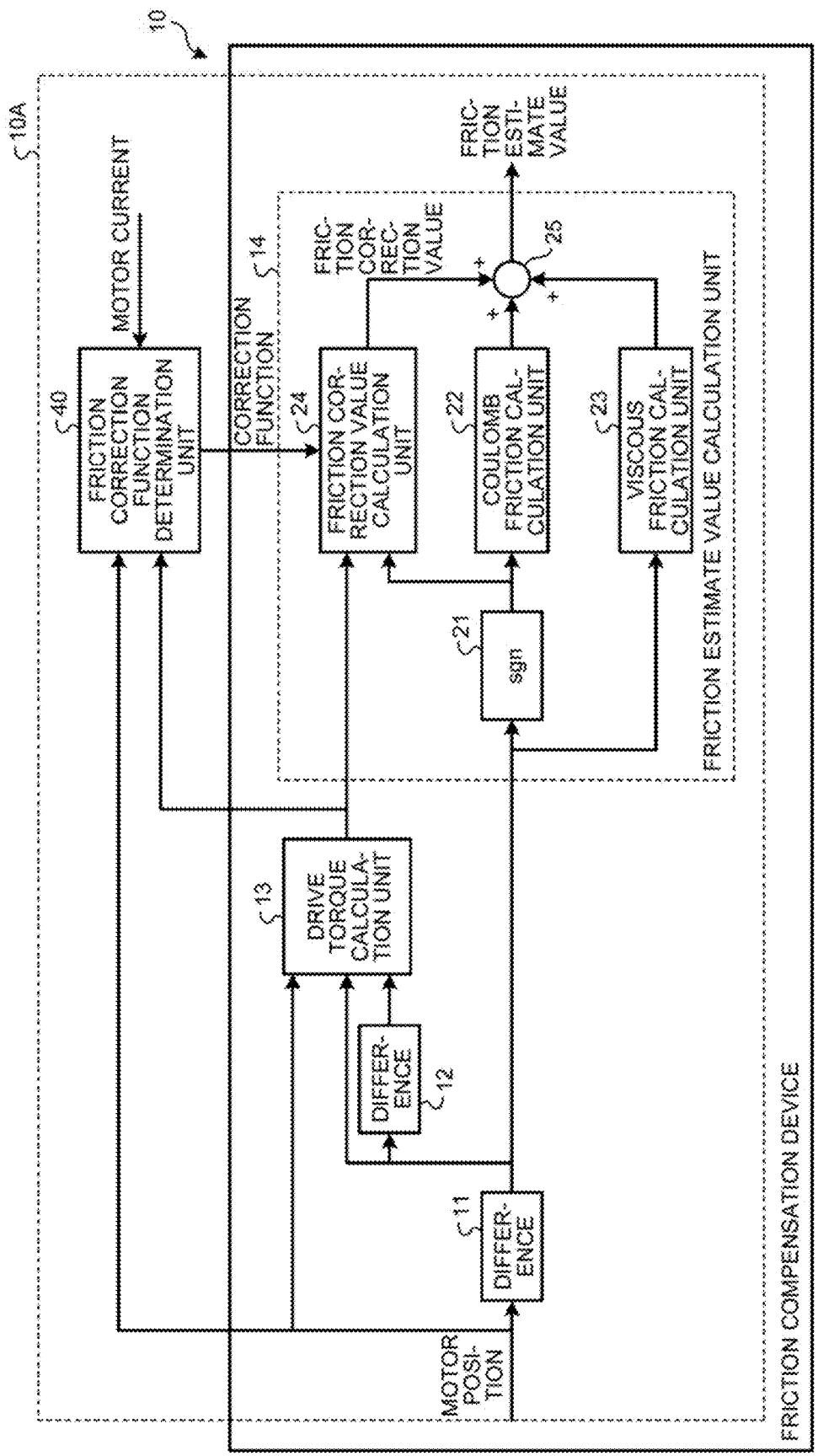
FIG. 9 is a block diagram schematically illustrating an example of a configuration of a friction compensation device according to an eighth embodiment.

FIG. 9 is a block diagram schematically illustrating an example of a configuration of a friction compensation device according to an eighth embodiment. Note that the same components as those in the above-described embodiments are denoted by the same reference numerals and will not be described. The following is the description as to difference from the above-described embodiments.

The friction compensation device 10 according to the eighth embodiment includes a friction correction function determination unit 40 instead of the friction correction parameter determination unit 30 according to the third embodiment. The friction compensation device 10 according to the eighth embodiment is different from that of the third embodiment in the functions of the drive torque calculation unit 13 and the friction correction value calculation unit 24.

The drive torque calculation unit 13 calculates a motor inertial force $\tau_m$ and a drive torque $\tau$ of the transmission mechanism, and outputs the motor inertial force $\tau_m$ and the drive torque $\tau$ to the friction correction function determination unit 40. The motor inertial force $\tau_m$ is torque required to accelerate or decelerate the motor. The drive torque $\tau$ is the sum of the inertial force, the centrifugal force and the Coriolis force, and gravity on the transmission mechanism of each shaft of the robot.

Figure 10:
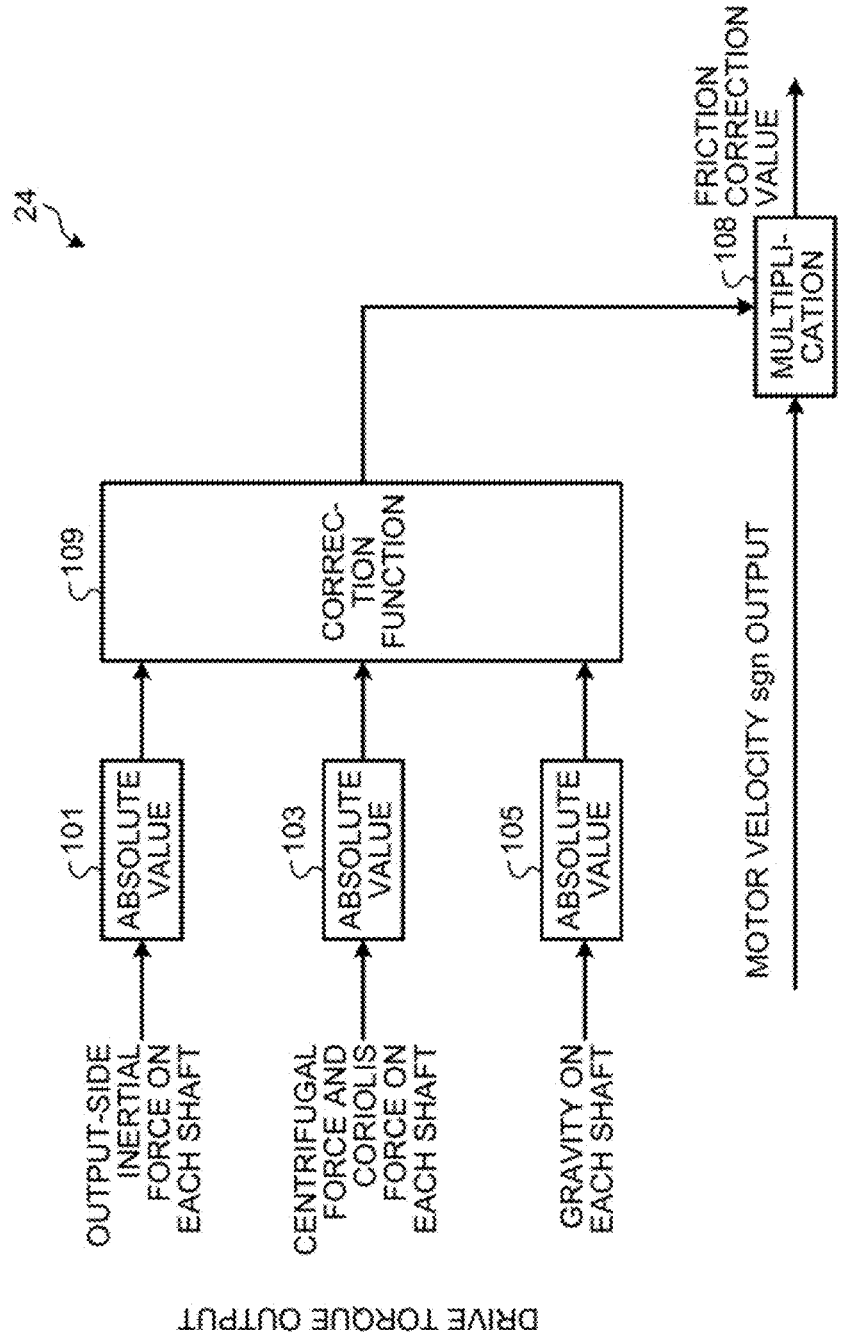
FIG. 10 is a block diagram schematically illustrating an example of a configuration of a friction correction value calculation unit in the friction compensation device according to the eighth embodiment.

FIG. 10 is a block diagram schematically illustrating an example of the configuration of the friction correction value calculation unit in the friction compensation device according to the eighth embodiment. The friction correction value calculation unit 24 includes the inertial force absolute value calculator 101, the centrifugal and Coriolis force absolute value calculator 103, the gravity absolute value calculator 105, a drive torque correction amount calculation unit 109, and the multiplier 108. The inertial force absolute value calculator 101, the centrifugal and Coriolis force absolute value calculator 103, the gravity absolute value calculator 105, and the multiplier 108 are the same as those described in FIG. 2 of the first embodiment, and thus will not be described.

The drive torque correction amount calculation unit 109 calculates a correction drive torque, using a correction function with inputs of the absolute value of the inertial force calculated by the inertial force absolute value calculator 101, the centrifugal and Coriolis force absolute value calculated by the centrifugal and Coriolis force absolute value calculator 103, and the gravity absolute value calculated by the gravity absolute value calculator 105. The correction function used in the drive torque correction amount calculation unit 109 is a correction function learned by the friction correction function determination unit 40 as will be described later.

Figure 11:
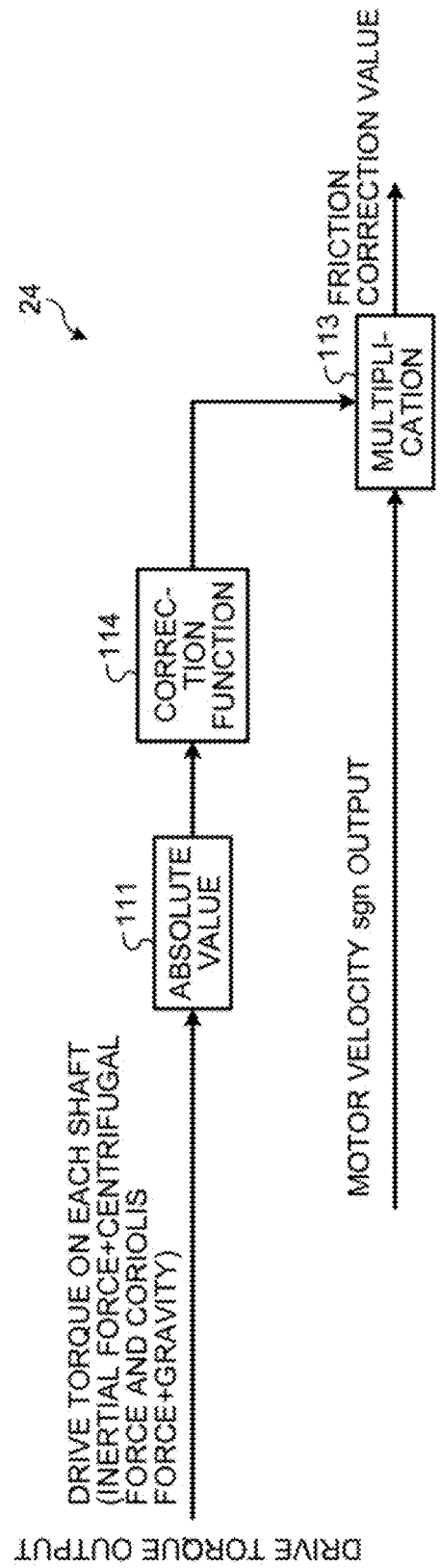
FIG. 11 is a block diagram schematically illustrating another example of the configuration of the friction correction value calculation unit in the friction compensation device according to the eight embodiment.

The friction correction value calculation unit 24 may have another configuration. FIG. 11 is a block diagram schematically illustrating another example of the configuration of the friction correction value calculation unit in the friction compensation device according to the eighth embodiment. The friction correction value calculation unit 24 includes the drive torque absolute value calculator 111, a drive torque correction amount calculation unit 114, and the multiplier 113. The drive torque absolute value calculator 111 and the multiplier 113 are the same as those described in FIG. 3 of the second embodiment and thus will not be described.

The drive torque correction amount calculation unit 114 in FIG. 11 calculates a correction drive torque, using a correction function with inputs of the absolute value of the sum of the inertial force, the centrifugal force and the Coriolis force, and gravity calculated by the drive torque absolute value calculator 111. The correction function used in the drive torque correction amount calculation unit 114 is a correction function learned by the friction correction function determination unit 40 as will be described later.

Figure 12:
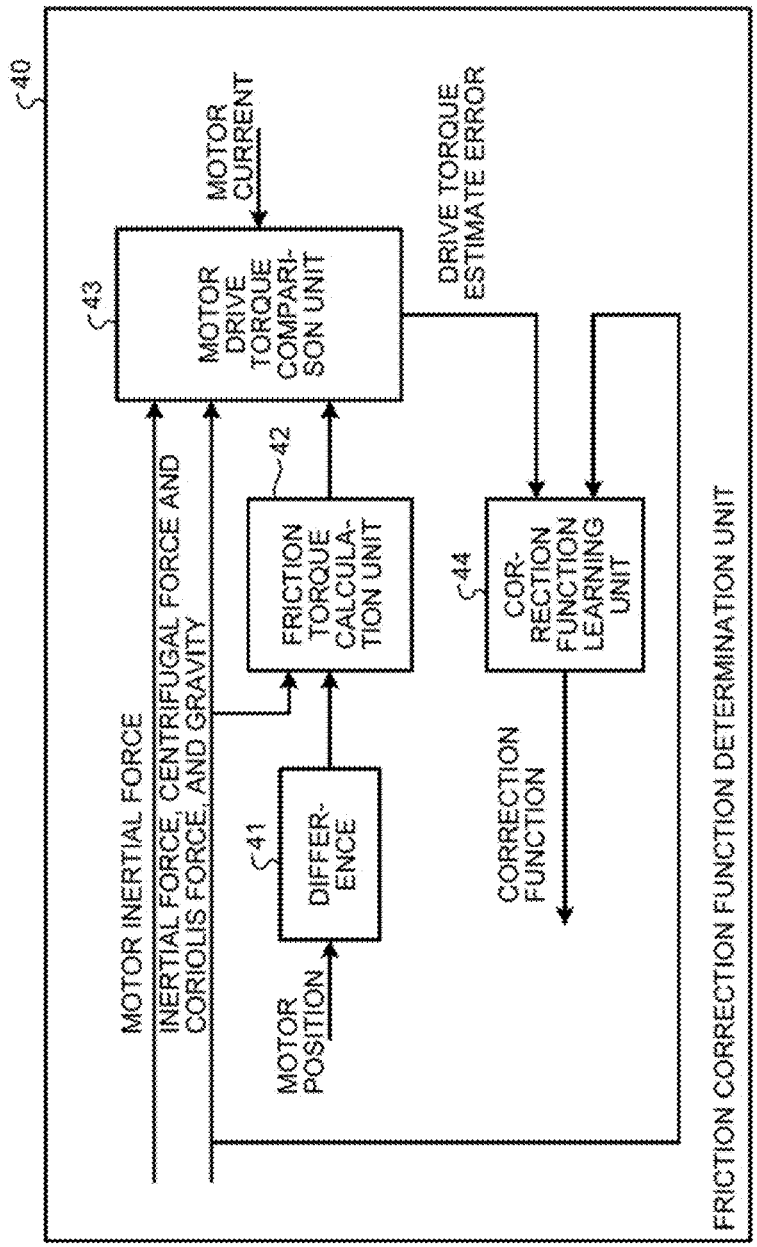
FIG. 12 is a block diagram schematically illustrating an example of a configuration of a friction correction function determination unit in friction correction value calculation for a robot according to the eight embodiment.

FIG. 12 is a block diagram schematically illustrating an example of a configuration of the friction correction function determination unit in friction correction value calculation for the robot according to the eighth embodiment. The friction correction function determination unit 40 includes a velocity calculator 41, a friction torque calculation unit 42, a motor drive torque comparison unit 43, and a correction function learning unit 44.

The velocity calculator 41 calculates the motor velocity, using the difference between input motor positions at different times. The friction torque calculation unit 42 calculates Coulomb friction and viscous friction, using the motor velocity input from the velocity calculator 41 and the inertial force, the centrifugal force and the Coriolis force, and gravity on the transmission mechanism input from the drive torque calculation unit 13. Furthermore, the friction torque calculation unit 42 calculates friction torque $\tau_{f0}$ that is the sum of the Coulomb friction and the viscous friction.

The motor drive torque comparison unit 43 calculates a drive torque estimate error, and outputs the drive torque estimate error to the correction function learning unit 44. The drive torque estimate error is the difference $\tau_r - (\tau + \tau_m + \tau_{f0})$ between the practical measured value $\tau_r$ of the drive torque calculated from the motor current and the sum of the motor inertial force the drive torque $\tau$ of the transmission mechanism, and the friction torque $\tau_{f0}$.

The correction function learning unit 44 learns a correction function having an input of the absolute value of each of the inertial force, the centrifugal force and the Coriolis force, and gravity, or the absolute value of the sum of the inertial force, the centrifugal force and the Coriolis force, and gravity, and having an output that agrees with the drive torque estimate error. That is, the correction function learning unit 44 learns the correction function to reduce an error from the drive torque estimate error. For example, the correction function that provides the smallest one of a plurality of errors from the drive torque estimate error is used. For the learning of the correction function, for example, a neural network, polynomial approximation, or the like can be applied. The correction function learning unit 44 outputs the learned correction function to the friction correction value calculation unit 24.

In the friction compensation device 10 of the eighth embodiment, a correction function, which has the input of the absolute value of each of the inertial force, the centrifugal force and the Coriolis force, and gravity, or the absolute value of the sum of the inertial force, the centrifugal force and the Coriolis force, and gravity, and has the output agreeing with a drive torque estimate error that is the difference between the practical measured value of the drive torque and the sum of the motor inertial force, the drive torque of the transmission mechanism, and the friction torque, is learned. The correction function, which is the result of the learning, is set in the friction correction value calculation unit 24. The friction correction value calculation unit 24 calculates the friction correction value, using the correction function. Consequently, friction components that vary non-linearly depending on the magnitude of the output torque of the transmission mechanism of each axis can also be compensated for with high accuracy. That is, it becomes possible to provide an effect of estimating the friction with high accuracy even where the friction has a non-linear relationship with the absolute value of each of the inertial force, the centrifugal force and the Coriolis force, and gravity, or the absolute value of the sum thereof.

Ninth Embodiment

Figure 13:
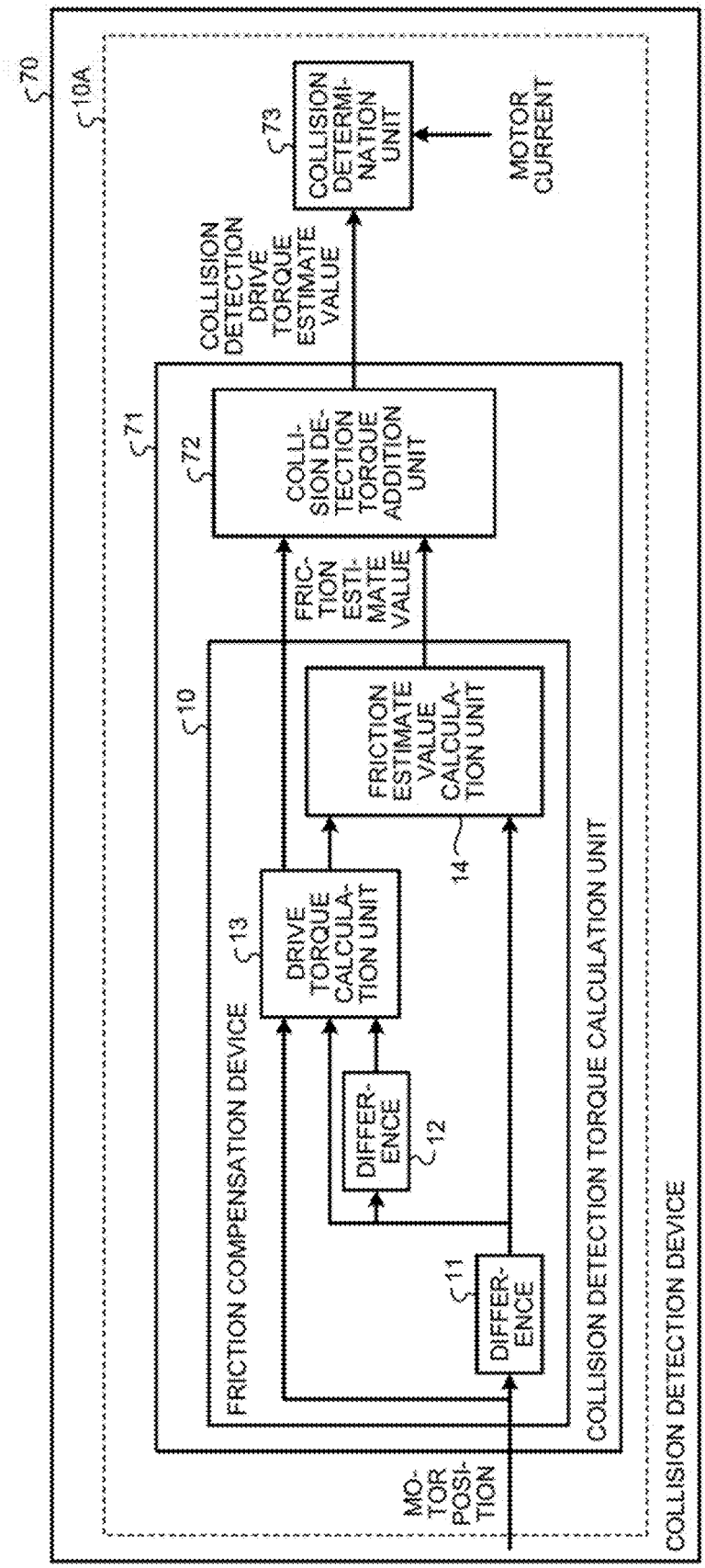
FIG. 13 is a block diagram schematically illustrating an example of a configuration of a collision detection device including a friction compensation device according to a ninth embodiment.

FIG. 13 is a block diagram schematically illustrating an example of a configuration of a collision detection device including a friction compensation device according to a ninth embodiment. A collision detection device 70 according to the ninth embodiment is provided inside a robot control device. The collision detection device 70 includes a collision detection torque calculation unit 71 and a collision determination unit 73. Note that the same components as those in the above-described embodiments are denoted by the same reference numerals and will not be described. The following is the description as to the difference from the above-described embodiments.

The collision detection torque calculation unit 71 includes the friction compensation device 10 and a collision detection torque addition unit 72. The friction compensation device 10 can be the one described in the first to eighth embodiments. The description of the ninth embodiment is based on the assumption that the friction compensation device 10 is the one described in the second embodiment. The collision detection torque calculation unit 71 and the collision determination unit 73 define the control unit 10A.

The position on each shaft of the robot is input to the collision detection torque calculation unit 71 in each predetermined cycle, for example, in each control cycle. The velocity calculator 11 calculates the motor velocity from the difference between input motor positions on each shaft of the robot. The acceleration calculator 12 calculates the motor acceleration from the difference between motor velocities input from the velocity calculator 11.

The drive torque calculation unit 13 calculates the motor inertial force $\tau_m$ and the drive torque $\tau$ of the transmission mechanism. The motor inertial force $\tau_m$ is torque required to accelerate or decelerate the motor. The drive torque $\tau$ is the sum of the inertial force, the centrifugal force and the Coriolis force, and gravity on the transmission mechanism of each shaft of the robot. The drive torque calculation unit 13 outputs the motor inertial force $\tau_m$ and the drive torque $\tau$ of the transmission mechanism to the collision detection torque addition unit 72, and outputs the drive torque $\tau$ of the transmission mechanism to the friction estimate value calculation unit 19.

The friction estimate value calculation unit 14 is the same as that described in the first and second embodiments. As in the second embodiment, the friction correction value calculation unit 24 calculates the absolute value of the input drive torque $\tau$ of the transmission mechanism, after which the friction correction value calculation unit 24 multiplies the absolute value by the correction gain, and further multiplies the result of that multiplication, by the same sign as the sign of the motor velocity to thereby calculate the friction correction value for the shaft. Furthermore, the friction estimate value calculation unit 14 calculates the Coulomb friction and the viscous friction, and calculates the friction estimate value $\tau_f$, that is the sum of the Coulomb friction, the viscous friction, and the friction correction value. The friction estimate value calculation unit 14 outputs the calculated friction estimate value $\tau_{fo}$ to the collision detection torque addition unit 72.

The motor inertial force $\tau_m$, the drive torque $\tau$ of the transmission mechanism, and the friction estimate value $\tau_m$ are input to the collision detection torque addition unit 72. The collision detection torque addition unit 72 calculates a collision detection drive torque estimate value $\tau_m$ that is the sum of the input motor inertial force $\tau_m$, drive torque $\tau$, and friction estimate value $\tau_m$. The collision detection torque addition unit 72 outputs the calculated collision detection drive torque estimate value $\tau_m$ to the collision determination unit 73.

The collision determination unit 73 compares the practical measured value $\tau$, of the drive torque calculated from the input motor current, with the collision detection drive torque estimate value $\tau_m$ input from the collision detection torque addition unit 72, to thereby determine whether or not the robot has collided with an obstacle. Specifically, if the difference between the practical measured value $\tau$, of the drive torque and the collision detection drive torque estimate value $\tau_m$ is equal to or larger than a predetermined threshold, the collision determination unit 73 determines that the robot has collided with an obstacle.

In the ninth embodiment, the collision detection device 70 includes the friction compensation device 10 described in the first to eighth embodiments. The sum of the friction estimate value calculated by the friction compensation device 10, the motor inertial force, and the drive torque of the transmission mechanism is defined as the collision detection drive torque estimate value. Whether or not the robot has collided with an obstacle is determined, using the difference between the practical measured value of the drive torque calculated from the motor current and the collision detection drive torque estimate value. In the collision detection drive torque estimate value, friction components that vary depending on the magnitude of the output torque of the transmission mechanism of each drive shaft are compensated for with high accuracy. Thus, it becomes possible to provide an effect of detecting the contact of the robot with an obstacle with high sensitivity.

Tenth Embodiment

Figure 14:
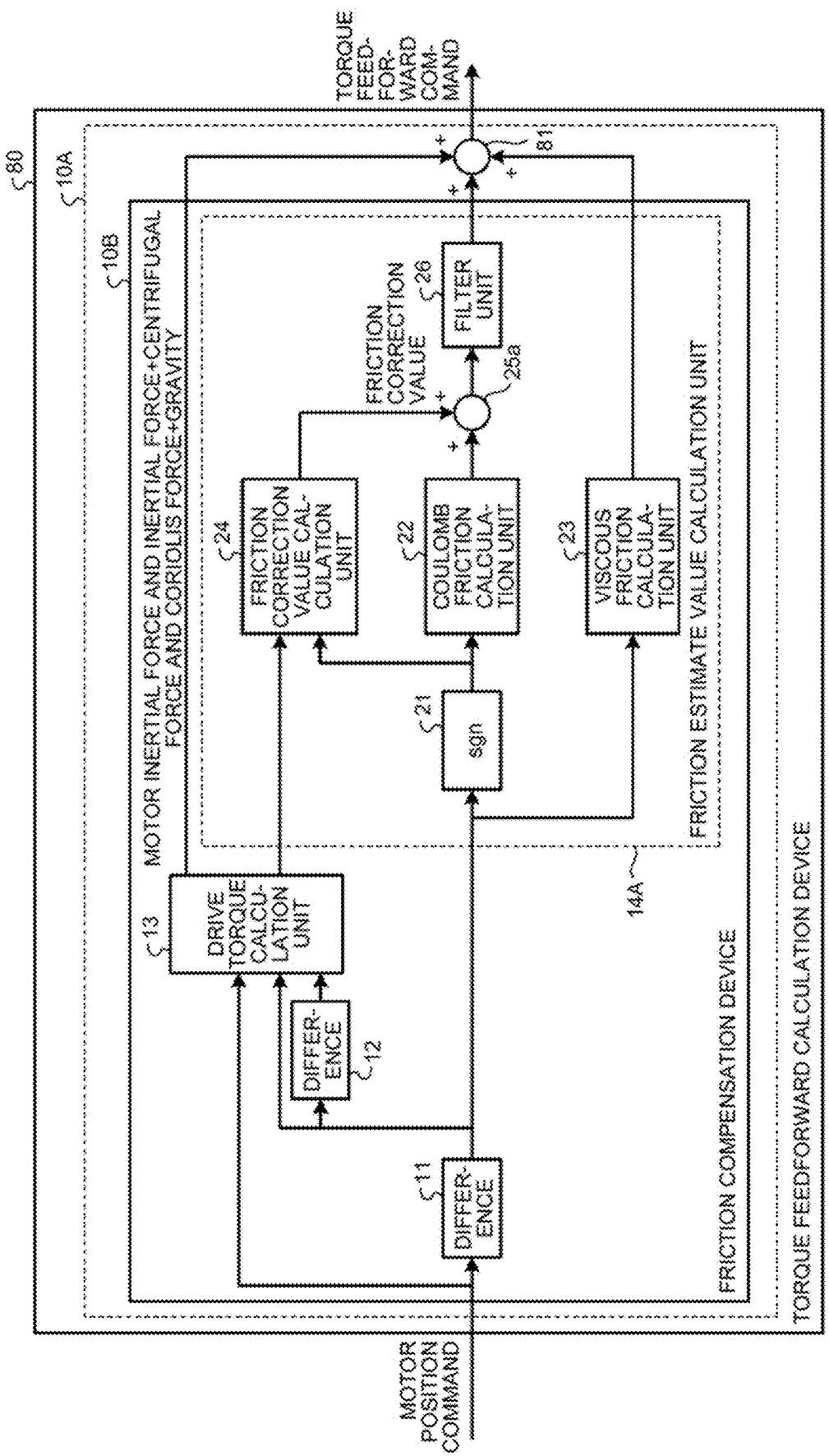
FIG. 14 is a block diagram illustrating an example of a configuration of a torque feedforward calculation device including a friction compensation device according to a tenth embodiment.

FIG. 14 is a block diagram illustrating an example of a configuration of a torque feedforward calculation device including a friction compensation device according to a tenth embodiment. A torque feedforward calculation device 80 is provided inside a robot control device. The torque feedforward calculation device 80 includes a friction compensation device 10B and a torque feedforward command generation unit 81. Note that the same components as those in the above-described embodiments are denoted by the same reference numerals and will not be described. The following is the description as to the difference from the above-described embodiments. The friction compensation device 10B and the torque feedforward command generation unit 31 define the control unit 10A.

The friction compensation device 10B basically has the same configuration as the friction compensation device 10 described in the first to eighth embodiments, but a configuration of a friction estimate value calculation unit 14A is different from that of the friction estimate value calculation unit 14 described in the first to eighth embodiments. The friction estimate value calculation unit 14A includes the sign circuit 21, the coulomb friction calculation unit 22, the viscous friction calculation unit 23, the friction correction value calculation unit 24, an adder 25a, and a filter unit 26. The sign circuit 21, the Coulomb friction calculation unit 22, the viscous friction calculation unit 23, and the friction correction value calculation unit 24 are the same as those described in the first to eighth embodiments. Here, the description of the tenth embodiment is based on the assumption that the friction correction value calculation unit 24 is the one described in the second embodiment.

The adder 25a adds the Coulomb friction output from the Coulomb friction calculation unit 22 and the friction correction value output from the friction correction value calculation unit 24. The filter unit 26 performs filtering on the result of the addition of the friction correction value and the Coulomb friction. An example of the filter unit 26 is a low-pass filter such as a moving-average filter, a first-order lag filter, or a second-order lag filter. The filter unit 26 outputs the result of the filtering to the torque feedforward command generation unit 81. The viscous friction calculation unit 23 outputs the calculated viscous friction to the torque feedforward command generation unit 81.

An outline of operation in the torque feedforward calculation device 30 will be described below. A motor position command for each shaft of the robot is input to the torque feedforward calculation device 80 in each predetermined cycle, for example, each control cycle. The velocity calculator 11 calculates a motor velocity command from the difference between input motor position commands for each shaft of the robot. The motor velocity command is a command on the motor velocity. The acceleration calculator 12 calculates a motor acceleration command from the difference between motor velocity commands input from the velocity calculator 11. The motor acceleration command is a command on the motor acceleration.

The drive torque calculation unit 13 calculates a motor inertial force $\tau_{m1}$ and a drive torque $\tau_{m1}$ of the transmission mechanism. The motor inertial force $\tau_{m1}$ is torque required to accelerate or decelerate the motor. The drive torque $\tau_d$ is the sum of an inertial force, a centrifugal force and a Coriolis force, and gravity on the transmission mechanism of each shaft of the robot. The drive torque calculation unit 13 outputs the drive torque $\tau_d$ of the transmission mechanism to the friction estimate value calculation unit 14, and outputs the motor inertial force $\tau_{md}$ and the drive torque $\tau_d$ of the transmission mechanism to the torque feedforward command generation unit 81.

The friction correction value calculation unit 24 is the same as that described in the second embodiment. As in the second embodiment, the friction correction value calculation unit 24 calculates the absolute value of the input drive torque $\tau_d$ of the transmission mechanism, after which the friction correction value calculation unit 24 multiplies the absolute value by the correction gain, and further multiplies the result of that multiplication, by the same sign as the sign of the motor velocity to thereby calculate the friction correction value for the shaft. The adder 25a adds the calculated friction correction value and the Coulomb friction calculated by the Coulomb friction calculation unit 22. The filter unit 26 performs filtering on the result of the addition of the friction correction value and the Coulomb friction.

The torque feedforward command generation unit 81 adds the result of the filtering of the result of the addition of the friction correction value and the Coulomb friction, the viscous friction calculated by the viscous friction calculation unit 23, and the motor inertial force $\tau_{m1}$ and the drive torque $\tau_d$ of the transmission mechanism calculated by the drive torque calculation unit 13. The torque feedforward command generation unit 81 then outputs a torque feedforward command that is the addition result to a motor control unit of each shaft (not illustrated).

The torque feedforward calculation device 80 of the tenth embodiment includes the friction compensation device 10B. The friction compensation device 10B has the same configuration as the friction compensation device 10 according to the first to eighth embodiments. The result of the passage of the sum of the friction correction value and the Coulomb friction through the low-pass filter and the viscous friction calculated by the friction compensation device 10B, the motor inertial force, and the drive torque of the transmission mechanism are added together into the torque feedforward command. In the torque feedforward command, friction components that vary depending on the magnitude of the output torque of the transmission mechanism of each drive axis are compensated for with high accuracy. It thus becomes possible to provide an effect of controlling the locus of the robot distal end with high accuracy.

Eleventh Embodiment

Figure 15:
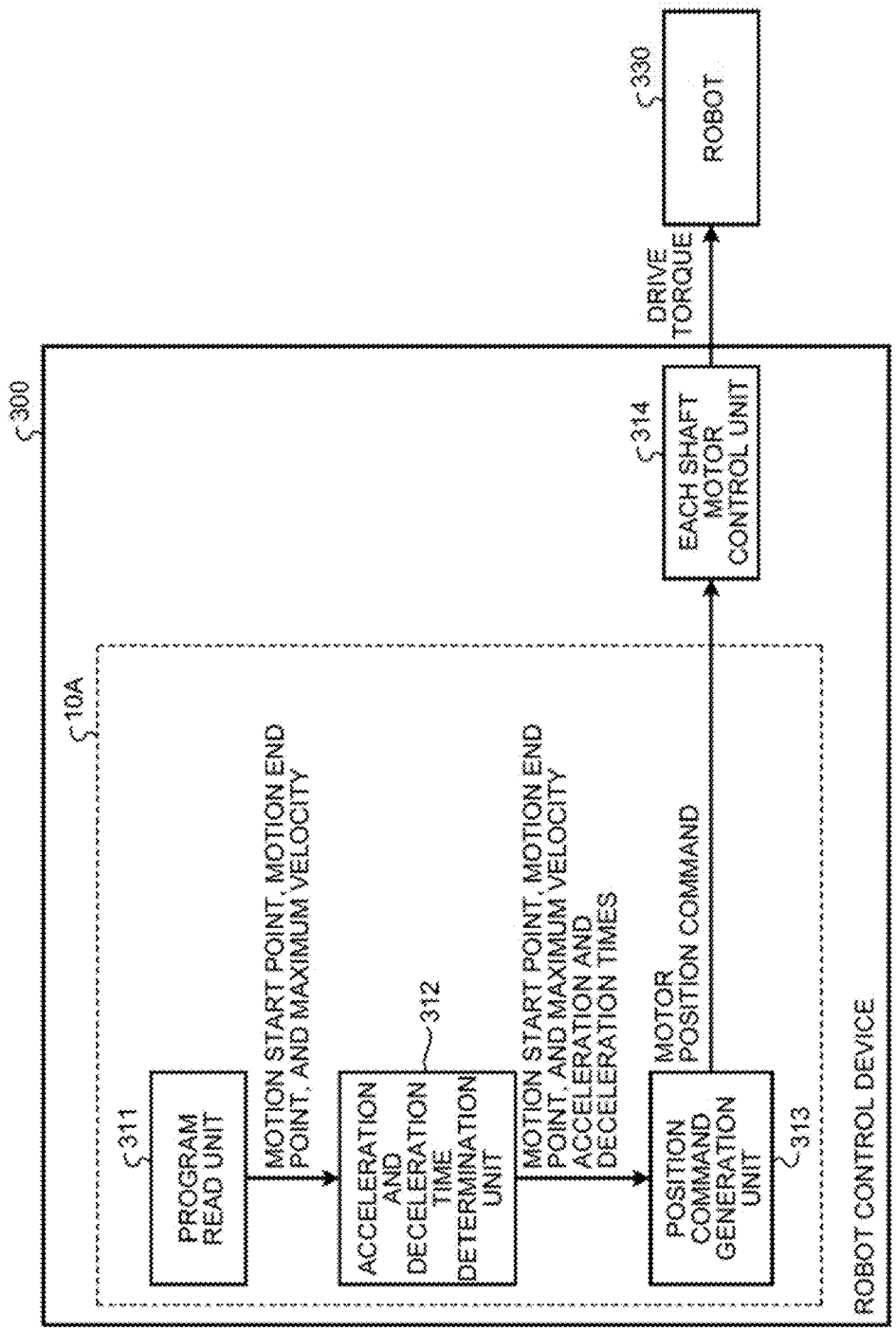
FIG. 15 is a block diagram schematically illustrating an example of a configuration of a robot control device including a friction compensation device according to an eleventh embodiment.

FIG. 15 is a block diagram schematically illustrating an example of a configuration of a robot control device including a friction compensation device according to an eleventh embodiment. A robot control device 300 is a device that controls a robot 330 that is a control target. The robot control device 300 includes a program read unit 311, an acceleration and deceleration time determination unit 312, a position command generation unit 313, and an each-shaft motor control unit 314.

The program read unit 311 sequentially reads each row of a robot program specified for execution. When a read robot command is a movement command, the program read unit 311 outputs a motion start point and a motion end point, of the movement command and a maximum velocity specified in the program to the acceleration and deceleration time determination unit 312.

Figure 16:
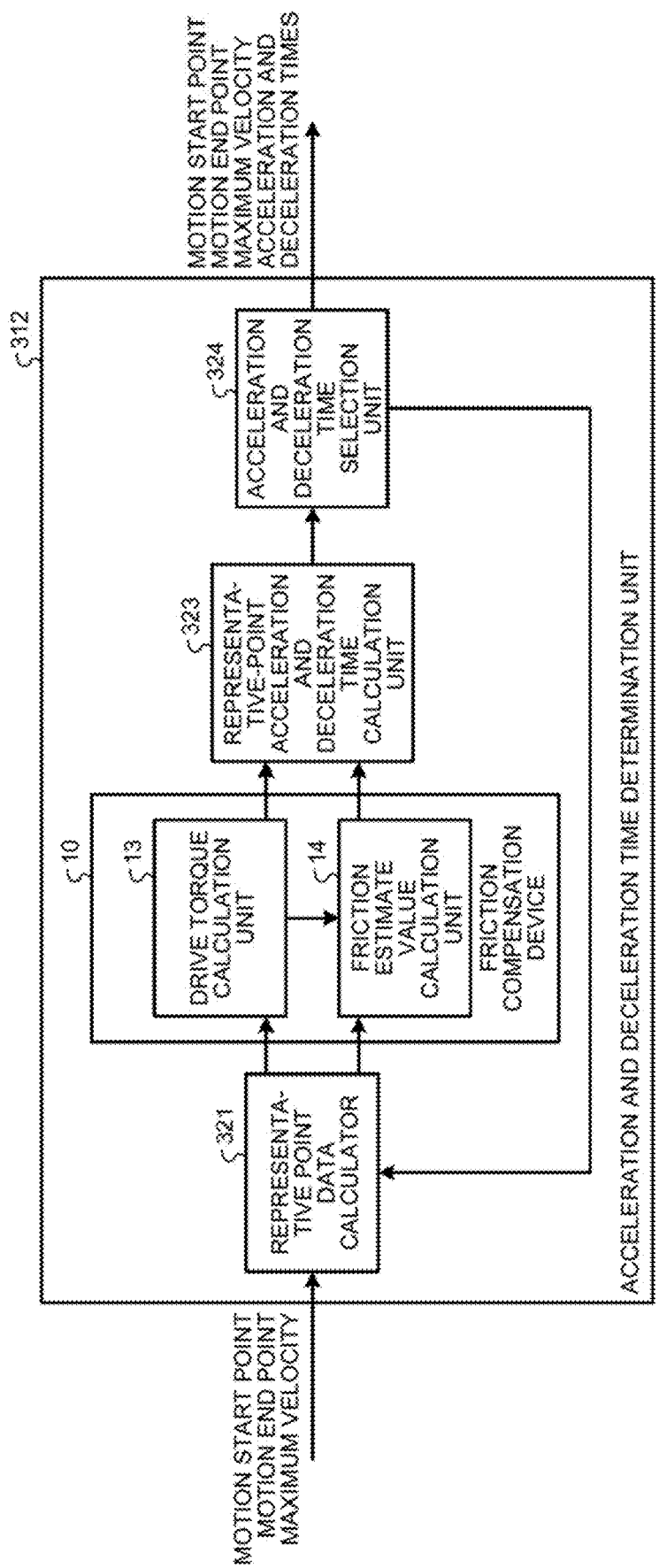
FIG. 16 is a block diagram schematically illustrating an example of a configuration of an acceleration and deceleration time determination unit in the robot control device according to the eleventh embodiment.

For example, the acceleration and deceleration time determination unit 312 determines acceleration and deceleration times that are an acceleration time and a deceleration time among representative points of a motion indicated by the movement command. In the case of a velocity trapezoidal pattern for operating the motion indicated by the movement command, for example, the difference between the time at an acceleration end point and the time at a motion start point corresponds to the acceleration time, and the difference between the time at a motion end point and the time at a deceleration start point corresponds to the deceleration time. FIG. 16 is a block diagram schematically illustrating an example of a configuration of the acceleration and deceleration time determination unit in the robot control device according to the eleventh embodiment. The acceleration and deceleration time determination unit 312 includes a representative point data calculator 321, the drive torque calculation unit 13, the friction estimate value calculation unit 14, a representative-point acceleration and deceleration time calculation unit 323, and an acceleration and deceleration time selection unit 324. The drive torque calculation unit 13 and the friction estimate value calculation unit 14 correspond to those of the friction compensation device 10 described in the first to eighth embodiments.

The program read unit 311 inputs, to the representative point data calculator 321, data on the motion start point, the motion end point, and the maximum velocity. The representative point data calculator 321 calculates positions and velocities at the representative points of the motion from that data input from the program read unit 311. In calculating the positions and the velocities at the representative points for the first time, the representative point data calculator 321 uses predetermined initial values of the acceleration and deceleration times to calculate these positions and velocities at the representative points. When the calculation of the acceleration and deceleration times at the representative points is repeated a plurality of times, the positions and the velocities at the representative points are calculated using the results of the previous calculation of the acceleration and deceleration times. The representative points are, for example, a motion start point, an acceleration end point, a deceleration start point, and a motion end point when the motion is operated in a velocity trapezoidal pattern. The representative points may be selected in any other manners. The midpoint of the motion, a midpoint of an acceleration section, etc. may be used as the representative points.

The drive torque calculation unit 13, the friction estimate value calculation unit 14, the representative-point acceleration and deceleration time calculation unit 323, and the acceleration and deceleration time selection unit 324 will be hereinbelow described taking a specific example where a representative point is an acceleration end point.

A vector composed of the motor position converted into that on the output shaft side of the transmission mechanism at the acceleration end point is denoted by and a vector composed of the motor velocity converted into that on the output shaft side of the transmission mechanism is denoted by $v_k$. A vector composed of a velocity obtained by converting the designated maximum velocity into that on the output shaft side of the transmission mechanism is denoted by $V_{max}$, and a vector composed of a value obtained by converting the allowable torque of the motor of each shaft into that on the output shaft side of the transmission mechanism is denoted by $\tau_{max}$. Further, the acceleration time among the initial values of the acceleration and deceleration times or the previous acceleration and deceleration times used to calculate the position and the velocity at the representative point is denoted by kt0. Using the following formula (10), the drive torque calculation unit 13 calculates Mddt that is a vector related to the inertial force on the output shaft side of the transmission mechanism. Using the following formula (11), the drive torque calculation unit 13 calculates torque Tora produced by the centrifugal force and Coriolis force and gravity on the output shaft side. Using the following formula (12), the drive torque calculation unit 13 calculates torque Torb produced by the inertial force, the centrifugal force and Coriolis force, and gravity on the output shaft side, that is, the inertial force.

$$\text{Mddt} = M(q_k)V_{max} \tag{10}$$

$$\text{Tora} = h(q_k, v_k) + g(q_k) \tag{11}$$

$$\text{Torb} = \text{Tora} + \text{Mddt}/kt0 \tag{12}$$

The matrix M and the vectors h and g are the same as those described in formula (1). The drive torque calculation unit 13 outputs calculated Mddt and Tora to the representative-point acceleration and deceleration time calculation unit 323, and outputs calculated Torb to the friction estimate value calculation unit 14.

The friction estimate value calculation unit 14 in this embodiment has the same configuration as the friction estimate value calculation unit 14 illustrated in FIGS. 1 and 3 of the second embodiment. That is, when the value of the correction gain in the friction correction value calculation unit 24 of each shaft of the robot 330 is denoted by $K_i$, an individual axis component of Torb is denoted by $Torb_i$, an individual axis component of the vector $v_k$ of the motor velocity converted into that on the output shaft side of the transmission mechanism is denoted by $v_{ki}$, the Coulomb friction coefficient for each shaft is denoted by $K_{fci}$, and the viscous friction coefficient for each shaft is denoted by $K_{fvi}$, the friction estimate value calculation unit 14 calculates a friction estimate value $Torf_i$ for each shaft from the following formula (13). The friction estimate value calculation unit 14 outputs the calculated friction estimate value $Torf_i$ for each shaft to the representative-point acceleration and deceleration time calculation unit 323.

$$Torf_i = abs(Torb_i)*K_i*sgn(v_{ki}) + K_{fci}*sgn(v_{ki}) + K_{fvi}*v_{ki} \quad (13)$$

When minimum positive kta satisfying the following formula (14) is denoted by $kta_i$, the representative-point acceleration and deceleration time calculation unit 323 outputs the largest value of $kta_i$ calculated for each axis to the acceleration and deceleration time selection unit 324. The largest value of $kta_i$ is defined as an acceleration time candidate kta at the representative point. Note that $Mddt_i$, $Tora_i$, and $\tau_{maxi}$ are the i-th axis components of Mddt, Tora, and $\tau_{max}$, respectively.

$$-\tau_{maxi} \leq Mddt_i/kta + Tora_i + Torf_i \leq \tau_{maxi} \quad (14)$$

When there are two or more representative points, the acceleration and deceleration time selection unit 324 selects the largest acceleration time from calculated acceleration time candidates among the two or more representative points. The same goes for the deceleration time. That is, the acceleration and deceleration time selection unit 324 selects the largest deceleration time from calculated deceleration time candidates among the two or more representative points. When selections of the largest acceleration time and the largest deceleration time reach a prescribed number of repetitions, the acceleration and deceleration time selection unit 324 outputs the selected acceleration time and deceleration time to the position command generation unit 313 in FIG. 15, as the acceleration and deceleration times of the motion, together with the motion start point, the motion end point, and the maximum velocity. When the prescribed number of repetitions has not been reached, the acceleration and deceleration time selection unit 324 outputs the selected acceleration time and deceleration time to the representative point data calculator 321, as the acceleration and deceleration times in the current repetition cycle. The representative point data calculator 321 utilizes the thus output acceleration and deceleration times for calculation of representative point data in the next repetition cycle.

Reference is made back to FIG. 15. On the basis of the motion start point, the motion end point, the maximum velocity, and the acceleration and deceleration times, all of which are input from the acceleration and deceleration time determination unit 312, the position command generation unit 313 generates a position command in each predetermined cycle, for example, each control cycle, and outputs the generated position command to the each-shaft motor control unit 314.

The each-shaft motor control unit 314 outputs the drive torque of the motor of each shaft to the robot 330 so that the position of each shaft follows the position command.

The above description has been made assuming that the friction estimate value calculation unit 14 has the configuration of the second embodiment. However, the friction estimate value calculation unit 14 may have the configuration of the first and third to eighth embodiments. The program read unit 311, the acceleration and deceleration time determination unit 312, and the position command generation unit 313 define the control unit 10A.

In the eleventh embodiment, the robot control device 300 includes the friction compensation device 10 described in the first to eighth embodiments. In the robot control device 300, friction components that vary depending on the magnitude of the output torque of the transmission mechanism of each drive axis are compensated for with high accuracy, so that the acceleration time and the deceleration time calculated from the equation of motion can be calculated with higher accuracy. In addition, it becomes possible to provide an effect that the respective operations of the robot control device 300 and the robot 330 can be speeded up, that is, the operating time of the robot 330 can be shortened to the extent that constraints are satisfied.

Twelfth Embodiment

Figure 17:
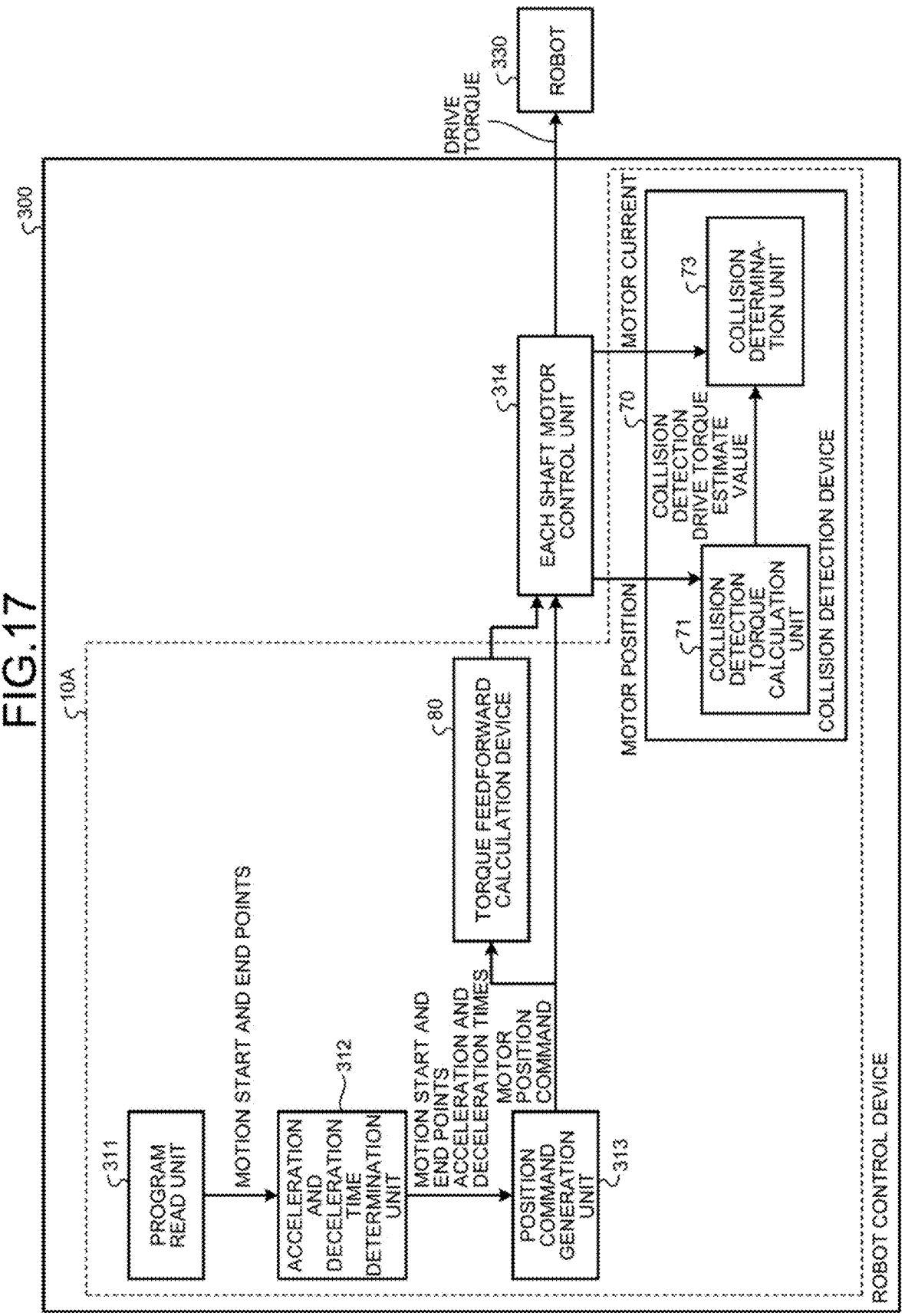
FIG. 17 is a block diagram schematically illustrating an example of a configuration of a robot control device including a friction compensation device according to a twelfth embodiment.

FIG. 17 is a block diagram schematically illustrating an example of a configuration of a robot control device including a friction compensation device according to a twelfth embodiment. Note that the same components as those in the above-described embodiments are denoted by the same reference numerals and will not be described. The following is the description only as to difference from the above-described embodiments. The robot control device 300 further includes the torque feedforward calculation device 80 in the tenth embodiment and the collision detection device 70 in the ninth embodiment. The torque feedforward calculation device 80 is provided between the position command generation unit 313 and the each-shaft motor control unit 314. The collision detection device 70 is provided such that the collision detection device 70 is connected to the each-shaft motor control unit 314. The collision detection device 70, the torque feedforward calculation device 80, the program read unit 311, the acceleration and deceleration time determination unit 312, and the position command generation unit 313 define the control unit 10A.

In the twelfth embodiment, the torque feedforward calculation device 80 and the collision detection device 70 are provided in the robot control device 300 of the eleventh embodiment. This can provide effects that the contact of the robot 330 with an obstacle can be detected with high sensitivity, and the locus of the distal end of the robot 330 can be controlled with high accuracy, in addition to the effects of the eleventh embodiment.

The functions of the friction compensation device 10 according to the first to eighth embodiments, the collision detection device 70 according to the ninth embodiment, the torque feedforward calculation device 80 according to the tenth embodiment, and the control unit 10A of the robot control device 300 according to the eleventh and twelfth embodiments are implemented by processing circuitry. The processing circuitry may be dedicated hardware or a processing device that executes a program stored in a storage device.

Figure 18:
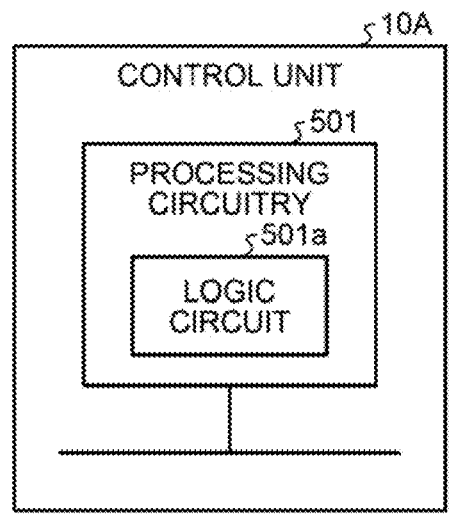
FIG. 18 is a diagram illustrating an example of a configuration in which functions of a control unit of a friction compensation device are implemented by hardware.

When the processing circuitry is dedicated hardware, the processing circuitry corresponds to a single circuit, a combined circuit, a programmed processor, a parallel-programmed processor, an application-specific integrated circuit, a field-programmable gate array, or a combination of them. FIG. 18 is a diagram illustrating an example of a configuration in which the functions of the control unit of the friction compensation device are implemented by hardware. A logic circuit 501a that implements the functions of the control unit 10A is incorporated in processing circuitry 501.

If the processing circuitry 501 is a processing device, the functions of the control unit 10A are implemented by software, firmware, or a combination of software and firmware.

Figure 19:
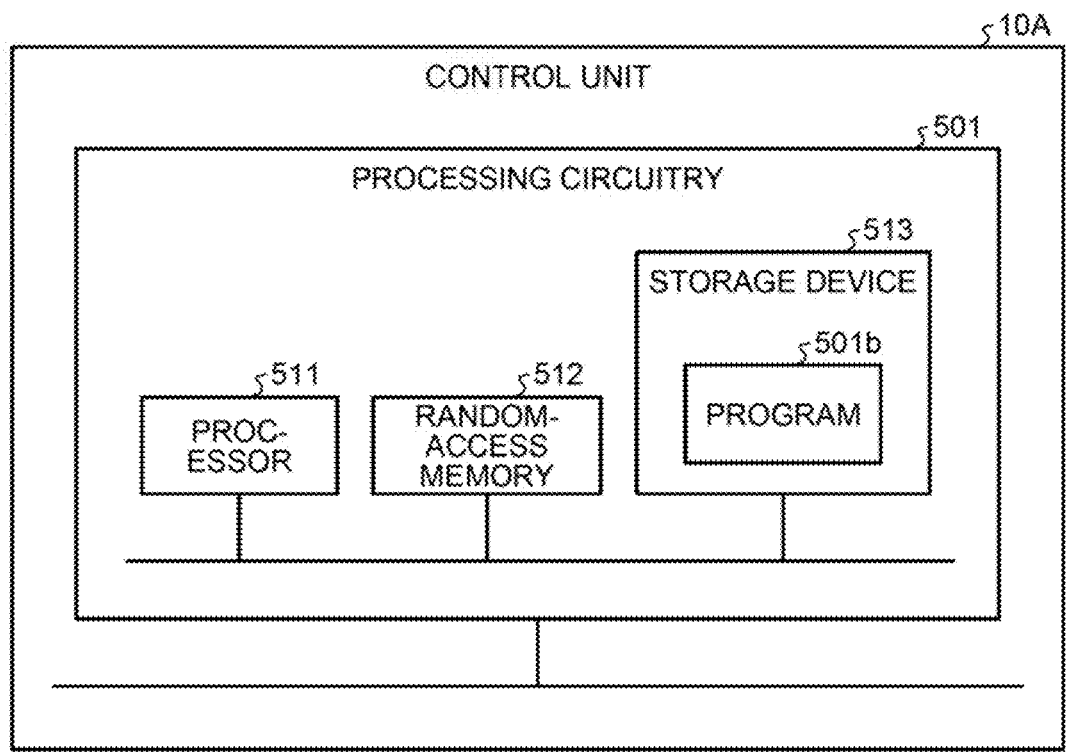
FIG. 19 is a diagram illustrating an example of a configuration in which functions of a control unit of a friction compensation device are implemented by software.

FIG. 19 is a diagram illustrating an example of a configuration in which the functions of the control unit of the friction compensation device are implemented by software. The processing circuitry 501 includes a processor 511 that executes a program 501b, random access memory 512 used as a work area by the processor 511, and a storage device 513 that stores the program 501b. The processor 511 develops and executes the program 501b stored in the storage device 513 on the random access memory 512, thereby implementing the functions of the control unit 10A. The software or firmware is described in a program language and stored in the storage device 513. The processor 511 can be exemplified by but is not limited to a central processing unit. For the storage device 513, semiconductor memory such as random access memory (RAM), read only memory (ROM), flash memory, an erasable programmable read only memory (EPROM), or an electrically erasable programmable read only memory (EEPROM) (registered trademark) can be used. The semiconductor memory may be nonvolatile memory or volatile memory. For the storage device 513, other than semiconductor memory, a magnetic disk, a flexible disk, an optical disk, a compact disk, a mini disk, or a digital versatile disc (DVD) can be used. The processor 511 may output data such as calculation results to the storage device 513 for storage, or may store the data in an auxiliary storage device (not illustrated) via the random access memory 512. By integrating the processor 511, the random access memory 512, and the storage device 513 on a single chip, the functions of the control unit 10A can be implemented by a microcomputer.

The processing circuitry 501 implements the functions of the control unit 10A by reading and executing the program 501b stored in the storage device 513. The program 501b can be said to cause a computer to execute a procedure and a method for implementing the functions of the control unit 10A.

For the processing circuitry 501, part of the functions of the control unit 10A may be implemented by dedicated hardware, and part of the functions of the control unit 10A may be implemented by software or firmware.

Thus, the processing circuitry 501 can implement the above-described functions by hardware, software, firmware, or a combination of them.

Here, the case for the control unit 10A of the friction compensation device 10 has been taken as an example, but the hardware configuration of the control unit 10A in the collision detection device 70, the torque feedforward calculation device 80, and the robot control device 300 is the same.

Thirteenth Embodiment

Figure 20:
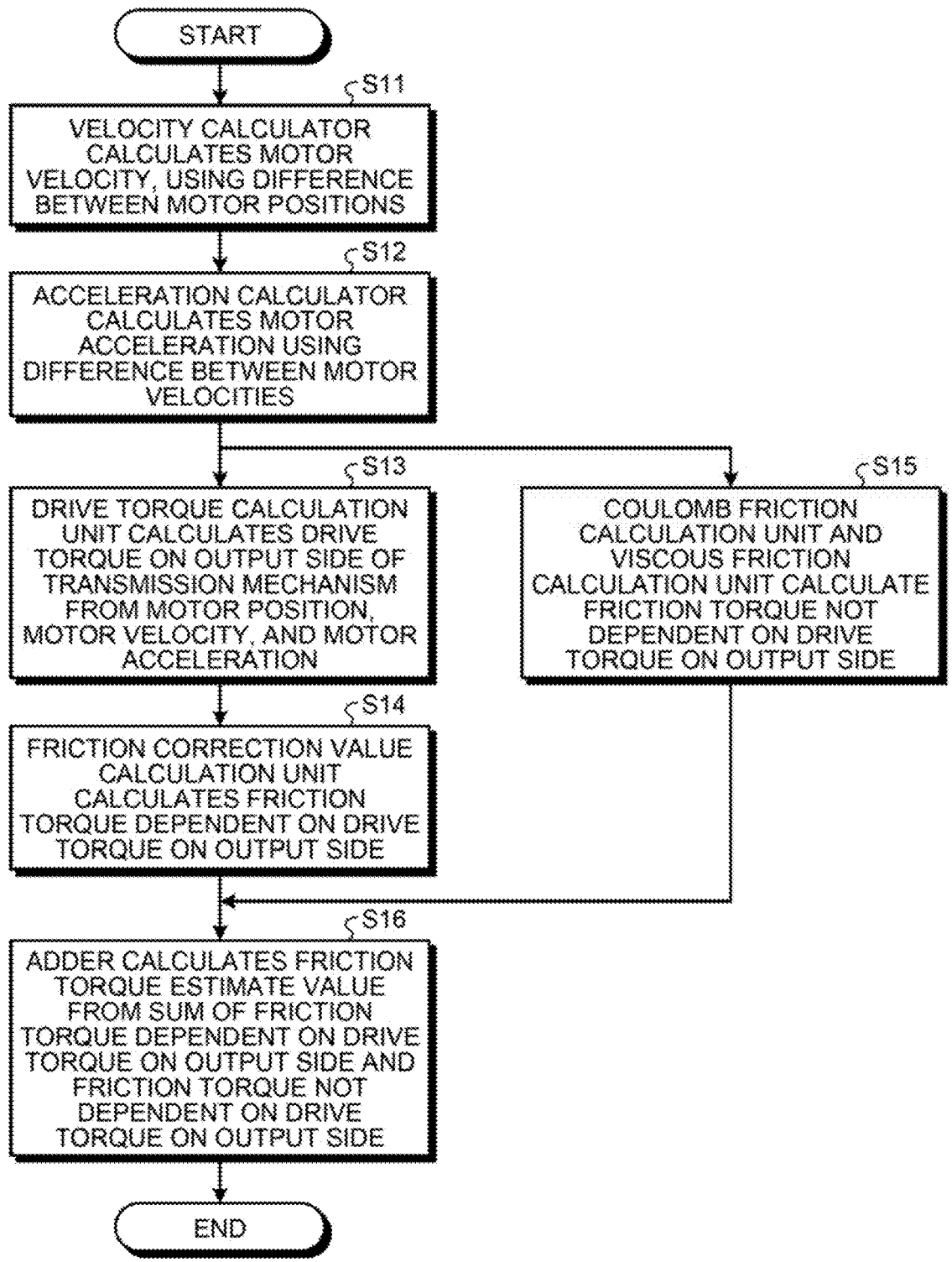
FIG. 20 is a flowchart illustrating an example of a friction compensation method according to a thirteenth embodiment.

FIG. 20 is a flowchart illustrating an example of a friction compensation method according to a thirteenth embodiment. A procedure for estimating friction torque in accordance with the friction compensation method is described. The friction compensation method for a robot is hereinbelow described with reference to the friction compensation device 10 in FIG. 1.

First, when motor positions are input to the velocity calculator 11, the velocity calculator 11 calculates the motor velocity from the difference between the motor positions (step S11). The acceleration calculator 12 calculates the motor acceleration from the difference between motor velocities (step S12). The calculated motor velocity is output to the drive torque calculation unit 13 and the friction estimate value calculation unit 14. The calculated motor acceleration is output to the drive torque calculation unit 13.

Next, the drive torque calculation unit 13 disposed on the output side of the transmission mechanism calculates drive torque on the output side of the transmission mechanism from the motor position, the motor velocity, and the motor acceleration (step S13). Specifically, the drive torque calculation unit 13 calculates the vectors "q", "v", and "a" composed of values obtained from the motor position, the motor velocity, and the motor acceleration each converted into those on the output side of the transmission mechanism, and calculates the vector t composed of the drive torque on the output side of the transmission mechanism of each shaft, in accordance with formula (1).

Thereafter, the friction correction value calculation unit 24 dependent on the drive torque on the output side calculates friction torque dependent on the drive torque on the output side (step S14). Specifically, the friction correction value calculation unit 24 calculates friction torque Torfa$_i$ on each shaft dependent on the drive torque on the output side, using the following formula (15) where $\tau_i$ and $v_i$ are, respectively, the i-th axis component of the vector $\tau$ of the drive torque and the i-th axis component of the vector v of the velocity obtained by converting the motor velocity into the output velocity of the transmission mechanism, and $K_i$ is the correction coefficient for each shaft of the friction torque dependent on the drive torque. The friction torque Torf$_i$ corresponds to the friction correction value.

$$\text{Torfa}_i = \text{abs}(\tau_i) * K_i * \text{sgn}(v_i) \qquad (15)$$

On the other hand, in parallel with steps S13 and S14, the Coulomb friction calculation unit 22 and the viscous friction calculation unit 23 that are not dependent on the drive torque on the output side calculate friction torque not dependent on the drive torque on the output side (step S15). Specifically, the Coulomb friction calculation unit 22, the viscous friction calculation unit 23, and the adder 25 obtain an individual axis component Torfb$_i$ of the friction torque independent of the drive torque on the output side, using the following formula (16) where $K_{fci}$ is the Coulomb friction coefficient for each shaft, and $K_{fvi}$ is the viscous friction coefficient for each shaft.

$$\text{Torfb}_i = K_{fci} * \text{sgn}(v_i) + K_{fvi} * v_i \qquad (16)$$

Thereafter, the adder 25 calculates a friction torque estimate value from the sum of the friction torque dependent on the drive torque on the output side and the friction torque not decedent on the drive torque on the output side (step S16). Specifically, the adder 25 adds calculated Torfa and Torfb for the individual axis components to calculate the friction torque estimate value for each shaft. This completes the friction compensation method.

In the friction compensation method according to the thirteenth embodiment, the friction correction value obtained by multiplying the absolute value of the drive torque of the transmission mechanism, the sign of the motor velocity, and the correction coefficient of the friction torque dependent on the drive-axis torque together is added to the sum of the Coulomb friction and the viscous friction to thereby calculate the friction torque estimate value. This has an effect that when the variation in friction torque occurs under the same conditions of the velocity and the drive unit temperature, the friction torque can be estimated with higher accuracy than the friction torque calculated on the basis of a friction model determined only by the velocity of each shaft. That is, it is possible to estimate, with high accuracy, friction that varies depending on the inertial force, the centrifugal force and the Coriolis force, and gravity on the output unit of the transmission mechanism.

In the above description, the case of compensating for friction on the drive axes of the robot has been taken as an example, but the above embodiments can be applied to all objects of control including drive axes such as industrial machines.

The configurations described in the above embodiments illustrate an example and can be combined with another known technique. The embodiments can be combined with each other. The configurations can be partly omitted or changed without departing from the gist.

REFERENCE SIGNS LIST 10, 10B friction compensation device; 10A control unit; 11, 31, 41 velocity calculator; 12 acceleration calculator; 13 drive torque calculation unit; 14, 14A friction estimate value calculation unit; 15 drive torque and non-drive axis torque calculation unit; 21 sign circuit; 22 Coulomb friction calculation unit; 23 viscous friction calculation unit; 24 friction correction value calculation unit; 25, 25a, 107, 127, 137, 138, 165, 166, 167 adder; 26 filter unit; 30 friction correction parameter determination unit; 32, 42 friction torque calculation unit; 33, 43 motor drive torque comparison unit; 34 parameter learning unit; 40 friction correction function determination unit; 44 correction function learning unit; 70 collision detection device; 71 collision detection torque calculation unit; 72 collision detection torque addition unit; 73 collision determination unit; 80 torque feedforward calculation device; 81 torque feedforward command generation unit; 100 drive torque correction amount calculator; 101, 121, 131 inertial force absolute value calculator; 102, 122, 132 inertial force correction unit; 103, 123, 133 centrifugal and Coriolis force absolute value calculator; 104, 124, 134 centrifugal and Coriolis force correction unit; 105, 125, 135 gravity absolute value calculator; 106, 126, 136 gravity correction unit; 108, 113 multiplier; 109, 114 drive torque correction amount calculation unit; 111 drive torque absolute value calculator; 112 drive torque correction unit; 120 non-drive X-axis torque correction amount calculator; 130 non-drive Y-axis torque correction amount calculator; 140 non-drive X-axis correction amount calculator; 141, 151, 161 force absolute value calculator; 142, 152, 162 force correction unit; 143, 153 moment absolute value calculator; 144, 154 moment correction unit; 150 non-drive Y-axis correction amount calculator; 160 drive-axis correction amount calculator; 300 robot control device; 311 program read unit; 312 acceleration and deceleration time determination unit; 313 position command generation unit; 314 each-shaft motor control unit; 321 representative point data calculator; 323 representative-point acceleration and deceleration time calculation unit; 324 acceleration and deceleration time selection unit; 330 robot.

The invention claimed is:

1. A friction compensation device comprising:
drive torque calculation circuitry to calculate an output torque of a transmission mechanism from a motor's position, velocity, and acceleration, using an inertial force, a centrifugal force and a Coriolis force, and gravity on a shaft, the transmission mechanism being connected to a motor via the shaft to transmit a driving force of the motor; and
friction estimate value calculation circuitry including friction correction value calculation circuitry to calculate a friction correction value to correct a friction force on the shaft, using a value obtained by multiplying a correction parameter by: an absolute value of each of the inertial force, the centrifugal force and the Coriolis force, and the gravity on the shaft output by the drive torque calculation circuitry as the output torque of the transmission mechanism; or an absolute value of a sum of the inertial force, the centrifugal force and the Coriolis force, and the gravity on the shaft output by the drive torque calculation circuitry as the output torque of the transmission mechanism, the correction parameter being a correction coefficient of friction that varies depending on an inertial force, a centrifugal force and a Coriolis force, and gravity on the transmission mechanism, the friction estimate value calculation circuitry calculating a friction estimate value, using the friction correction value, the friction estimate value being an estimated value of a friction force on the shaft.

2. The friction compensation device according to claim 1, further comprising:
correction parameter determination circuitry to determine the correction parameter,
the correction parameter determination circuitry calculating the correction parameter, using: a sum of Coulomb friction and viscous friction calculated using the motor's position; a practical measured value of drive torque calculated from a motor current that is a current in the motor; a motor inertial force that is torque required to accelerate or decelerate the motor; and the output torque output from the drive torque calculation circuitry.

3. The friction compensation device according to claim 2, wherein
the correction parameter determination circuitry further includes parameter learning circuitry to learn the correction parameter such that a drive torque estimate error becomes smaller than a predetermined value, the drive torque estimate error being a difference between the practical measured value of the drive torque and a sum of the output torque of the transmission mechanism, the motor inertial force, and the friction estimate value.

4. The friction compensation device according to claim 1, wherein
the drive torque calculation circuitry further calculates moments and forces in non-drive directions that are not a drive direction, in addition to the output torque of the transmission mechanism of the shaft, and
the friction estimate value calculation circuitry calculates the friction correction value for the shaft, in accordance with the output torque and the moments and forces in the non-drive directions calculated by the drive torque calculation circuitry.

5. A friction compensation device comprising:

drive torque calculation circuitry to calculate an output torque of a transmission mechanism from a motor's position, velocity, and acceleration, using an inertial force, a centrifugal force and a Coriolis force, and gravity on a shaft, the transmission mechanism being connected to a motor via the shaft to transmit a driving force of the motor;

friction estimate value calculation circuitry including friction correction value calculation circuitry to calculate a friction correction value to correct a friction force on the shaft, by inputting, to a correction function, an absolute value of: each of the inertial force, the centrifugal force and the Coriolis force, and the gravity on the shaft output by the drive torque calculation circuitry as the output torque of the transmission mechanism; or a sum of the inertial force, the centrifugal force and the Coriolis force, and the gravity on the shaft output by the drive torque calculation circuitry as the output torque of the transmission mechanism, the friction estimate value calculation circuitry calculating a friction estimate value, using the friction correction value, the friction estimate value being an estimated value of the friction force on the shaft; and correction function determination circuitry to determine the correction function, wherein the correction function determination circuitry learns the correction function having an input of the absolute value of each of the inertial force, the centrifugal force and the Coriolis force, and the gravity on the shaft, and having an output agreeing with a drive torque estimate error that is a difference between a practical measured value of drive torque calculated from a motor current that is a current in the motor and a sum of the output torque of the transmission mechanism, a motor inertial force that is torque required to accelerate or decelerate the motor, and Coulomb friction and viscous friction calculated using the motor's position.

6. A robot control device comprising:

program read circuitry to output a motion start point and a motion end point of a movement command in a robot program, and a maximum velocity specified in the robot program;

acceleration and deceleration time determination circuitry to calculate, from data on the motion start point, the motion end point, and the maximum velocity, an acceleration time and a deceleration time among representative points of a motion based on the data on the motion start point, the motion end point, and the maximum velocity, as acceleration and deceleration times;

position command generation circuitry to generate a position command in each predetermined cycle, on the basis of the data on the motion start point, the motion end point, and the maximum velocity, and the acceleration and deceleration times; and each-shaft motor control circuitry to control a robot on the basis of the position command, wherein the acceleration and deceleration time determination circuitry includes a friction compensation device including:

drive torque calculation circuitry to calculate an output torque of a transmission mechanism from a motor's position, velocity, and acceleration, using an inertial force, a centrifugal force and a Coriolis force, and gravity on a shaft, the transmission mechanism being connected to a motor via the shaft to transmit a driving force of the motor;

friction estimate value calculation circuitry including friction correction value calculation circuitry to calculate a friction correction value to correct a friction force on the shaft, using a value obtained by multiplying a correction parameter by: an absolute value of each of the inertial force, the centrifugal force and the Coriolis force, and the gravity on the shaft output by the drive torque calculation circuitry as the output torque of the transmission mechanism or an absolute value of a sum of the inertial force, the centrifugal force and the Coriolis force, and the gravity on the shaft output by the drive torque calculation circuitry as the output torque of the transmission mechanism, the correction parameter being a correction coefficient of friction that varies depending on an inertial force, a centrifugal force and a Coriolis force, and gravity on the transmission mechanism, the friction estimate value calculation circuitry calculating a friction estimate value, using the friction correction value, the friction estimate value being an estimated value of a friction force on the shaft, the acceleration and deceleration time determination circuitry calculating the friction estimate value required in calculation of the acceleration and deceleration times.

7. The robot control device according to claim 6, further comprising:

torque feedforward calculation circuitry to output a torque feedforward command to each-shaft motor control circuitry, using a motor position command, and the torque generate the torque feedforward command, using the position command generated by the position command generation circuitry; and collision detection circuitry including: collision detection torque addition circuitry to calculate a collision detection drive torque estimate value by adding the friction estimate value, a motor inertial force that is torque required to accelerate or decelerate the motor, and the output torque of the transmission mechanism calculated by the friction compensation device; and collision determination circuitry to determine whether or not a robot has collided with an obstacle by comparing the collision detection drive torque estimate value with a practical measured value of drive torque calculated from a motor current obtained from the motor, the collision detection circuitry determining whether or not the robot has collided with the obstacle by comparing drive torque calculated from a motor current detected by the each-shaft motor control circuitry with the collision detection drive torque estimate value.

* * * * *